US009219950B2

(12) United States Patent
Kitazato

(10) Patent No.: US 9,219,950 B2
(45) Date of Patent: Dec. 22, 2015

(54) REPRODUCTION APPARATUS, REPRODUCTION METHOD, AND PROGRAM

(71) Applicant: Sony Corporation, Minato-ku (JP)

(72) Inventor: Naohisa Kitazato, Minato-ku (JP)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 13/646,933

(22) Filed: Oct. 8, 2012

(65) Prior Publication Data

US 2013/0111530 A1 May 2, 2013

Related U.S. Application Data

(60) Provisional application No. 61/554,141, filed on Nov. 1, 2011.

(51) Int. Cl.

| | |
|---|---|
| ***H04N 7/173*** | (2011.01) |
| ***H04N 21/6547*** | (2011.01) |
| ***H04N 21/462*** | (2011.01) |
| ***H04N 21/4627*** | (2011.01) |
| ***H04N 21/61*** | (2011.01) |
| ***H04N 21/81*** | (2011.01) |

(Continued)

(52) U.S. Cl.

CPC ....... *H04N 21/6547* (2013.01); *H04N 21/4622* (2013.01); *H04N 21/4627* (2013.01); *H04N 21/478* (2013.01); *H04N 21/47202* (2013.01); *H04N 21/6125* (2013.01); *H04N 21/8166* (2013.01); *H04N 21/83555* (2013.01); *H04N 21/8456* (2013.01); *H04N 21/8543* (2013.01); *H04N 21/8547* (2013.01)

(58) Field of Classification Search

CPC .......... H04N 7/17318; H04N 7/17336; H04N 21/47202

USPC .................. 725/86–116, 131–134, 139–142, 725/151–153; 709/217–232

See application file for complete search history.

(56) References Cited

U.S. PATENT DOCUMENTS 6,101,488 A * 8/2000 Hayashi et al. ................. 706/45
6,185,621 B1 * 2/2001 Romine ........................ 709/231

(Continued)

FOREIGN PATENT DOCUMENTS

JP 2011-193058 A 9/2011

OTHER PUBLICATIONS

International Search Report issued Jan. 29, 2013 in PCT/JP2012/077577 filed Oct. 25, 2012 with English language translation.

(Continued)

*Primary Examiner* — Annan Shang

(74) *Attorney, Agent, or Firm* — Oblon, McClelland, Maier & Neustadt, L.L.P.

(57) ABSTRACT

Disclosed herein is a reproduction apparatus including: a reproduction control information acquisition block configured to acquire reproduction control information for controlling reproduction of content; a reproduction block configured to reproduce, in accordance with the acquired reproduction control information, the content that is distributed; and a control block configured to control an operation of an application program that is executed in operative connection with the content being reproduced in accordance with information associated with the application program and obtained from the acquired reproduction control information.

14 Claims, 34 Drawing Sheets

(51) Int. Cl.

| | |
|---|---|
| ***H04N 21/845*** | (2011.01) |
| ***H04N 21/8543*** | (2011.01) |
| ***H04N 21/8355*** | (2011.01) |
| ***H04N 21/472*** | (2011.01) |
| ***H04N 21/478*** | (2011.01) |
| ***H04N 21/8547*** | (2011.01) |

(56) References Cited

U.S. PATENT DOCUMENTS

| | | | | |
|---|---|---|---|---|
| 6,240,555 | B1 * | 5/2001 | Shoff et al. | 725/110 |
| 6,571,392 | B1 * | 5/2003 | Zigmond et al. | 725/110 |
| 7,039,048 | B1 * | 5/2006 | Monta et al. | 370/389 |
| 7,404,010 | B1 * | 7/2008 | Gardell et al. | 709/246 |
| 7,941,349 | B2 * | 5/2011 | Lee | 705/26.5 |
| 8,255,961 | B2 * | 8/2012 | Ellis | 725/93 |
| 8,387,086 | B2 * | 2/2013 | Agarwal et al. | 725/32 |
| 2001/0003829 | A1 * | 6/2001 | Romine | 709/219 |
| 2005/0157749 | A1 * | 7/2005 | Lee et al. | 370/466 |
| 2008/0098450 | A1 * | 4/2008 | Wu et al. | 725/132 |

OTHER PUBLICATIONS

ETSI TS 102 809; Digital Video Broadcasting (DVB); Signalling and carriage of interactive applications and services in Hybrid broadcast/broadband environments, V1.1.1, Jan. 2010, pp. 59, 80-81.

* cited by examiner

FIG. 6

```
<?xml version='1.0' encoding="UTF-8" ?>
<eri>
    <header>
            <date>20050314</date>
            <time>150749</time>
            <encryption>1</encryption>
    </header>
    <startup>
            <content_title>CONTENT ABC</content_title>
            <content_abstract>ABSTRACT OF CONTENT ABC
            </content_abstract>
            <duration>021320</duration>
            <start>rtsp://xxxxxxxx.tts</start>
    </startup>
    <content_chapter_info>
            <chapter_number="1">
                    <chapter_point>1380</chapter_point>
                    <chapter_title>INTRODUCTION</chapter_title>
            </chapter>
            <chapter_number="2">
                          :
    </content_chapter_info>
    <ES_info>
            <video_info_resolution="1" coding="avc"/>
            <audio_info_ES_number="1" mode="stereo"/>
                    <audio_title>MAIN AUDIO</audio_title>
            </audio_info>
            </caption_info_number="1" language="ja"/>
    </ES_info>
</eri>
```

FIG. 7

| ELEMENT AND ATTRIBUTE | | | OCCURRENCE COUNT | MEANING |
|---|---|---|---|---|
| eri | | | | |
| | app_control_info | | 0..N | |
| | | @control_type | 1 | CONTROL TYPE:<br>ONE OF "direct," "file," AND "stream." |
| | | app_id | 0..1 | APPLICATION ID (SPECIFIED ONLY FOR "direct") |
| | | app_type | 0..1 | APPLICATION TYPE "html," etc.<br>(SPECIFIED ONLY FOR "direct") |
| | | app_url | 0..1 | APPLICATION ACQUISITION DESTINATION URL<br>(SPECIFIED ONLY FOR "direct") |
| | | destination | 0..1 | APPLICATION DESTINATION "receiver"<br>(SPECIFIED ONLY FOR "direct") |
| | | expire_date | 0..1 | APPLICATION EXPIRATION DATE<br>(SPECIFIED ONLY FOR "direct") |
| | | app_control_url | 0..1 | APPLICATION CONTROL INFORMATION ACQUISITION DESTINATION URL<br>(SPECIFIED ONLY FOR "file") |
| | | app_control_position | 0..1 | APPLICATION CONTROL INFORMATION EMBED POSITION<br>"pes," "section," "audio_es," "video_es," or "watermark"<br>(SPECIFIED ONLY FOR "stream") |

FIG. 9

```
<?xml version='1.0' encoding="UTF-8"?>
<eri>
                    ·
                    ·
                    ·
    <app_control_info control_type="direct">
        <app_id>1</app_id>
        <app_type>html</app_type>
        <app_url>http://xxxxxxx</app_url>
        <expire_date>2011-10-12</expire_date>
    </app_control_info>
</eri>
```

FIG.12

```
<?xml version='1.0' encoding="UTF-8"?>
<eri>
                    .
                    .
                    .
   <app_control_info control_type="file">
      <app_control_url>http://xxxxxx</app_control_url>
   </app_control_info>
</eri>
```

FIG. 15

| ELEMENT(ATTRIBUTE) | OCCURRENCE COUNT | VALUE | DEFINITION AND DETAIL OPERATION |
|---|---|---|---|
| segment_sequence | 1 | | |
| segment | 1..N | | DATA SEGMENT |
| @segment_number | 1 | | SEGMENT NUMBER |
| @time_unit | 1 | | TIMING SPECIFICATION METHOD:<br>"utc" = ABSOLUTE DATE,<br>"smpte" = RELATIVE TIME, AND "pts" = PTS VALUE |
| start_time | 1 | | SEGMENT START TIMING |
| end_time | 1 | | SEGMENT END TIMING |
| command | 0..1 | | APPLICATION COMMAND |
| metadata | 0..1 | | METADATA |

FIG. 16

| ELEMENT (ATTRIBUTE) | OCCURRENCE COUNT | DEFINITION AND DETAIL OPERATION |
|---|---|---|
| command | 1 | |
| @destination | 1 | COMMAND APPLICATION DEVICES:<br>"receiver" = RECEPTION APPARATUS MAIN,<br>"external-1" = EXTERNAL APPARATUS TYPE 1,<br>AND "external_2" = EXTERNAL APPARATUS TYPE 2. |
| @action | 1 | CONTENTS OF COMMANDS:<br>"execute" = EXECUTE APPLICATION,<br>"register" = REGISTER APPLICATION,<br>"suspend" = SUSPEND APPLICATION,<br>"terminate" = TERMINATE APPLICATION,<br>and "event" = FIRE EVENT. |
| diffusion | 0..1 | DIFFUSION OF COMMAND APPLICATION TIMING |
| @rate | 1 | DISTRIBUTION COUNT |
| @range | 1 | MAXIMUM DELAY TIME |
| @period | 1 | COMMAND APPLICATION DIFFUSION PERIOD |

FIG. 17

| ELEMENT (ATTRIBUTE) | OCCURRENCE COUNT | DEFINITION AND DETAIL OPERATION |
|---|---|---|
| command | 1 | DESCRIPTION OF TARGET APPLICATION |
| @id | 1 | APPLICATION ID |
| @url | 0..1 | APPLICATION ACQUISITION DESTINATION URL<br>ESSENTIAL FOR "execute" AND "register" |
| @expire_date | 0..1 | APPLICATION EXPIRATION DATE<br>ESSENTIAL FOR "execute" AND "register" |
| @scope | 0..1 | APPLICATION VALID SCOPE<br>ESSENTIAL FOR "execute" AND "register" |
| event | 0..1 | APPLICATION EVENT<br>ESSENTIAL FOR "event" |
| @id | 1 | EVENT ID |
| related_data | 0..1 | DATA TO BE ENTERED IN APPLICATION IN ASSOCIATION WITH EVENT |

FIG.19

| ELEMENT(ATTRIBUTE) | OCCURRENCE COUNT | DEFINITION AND DETAIL OPERATION |
|---|---|---|
| metadata | 1 | |
| @type | 1 | META DATA TYPE:<br>"application_data" = DATA FOR APPLICATION,<br>"caption" = TEXT CAPTION DATA,<br>"subtitle" = BITMAP CAPTION DATA,<br>AND OTHERS. |
| @target | 0..1 | TARGET APPLICATION:<br>SPECIFIED BY TARGET APPLICATION ID AND NOT SPECIFIED IF RESIDENT APPLICATION IS TARGET APPLICATION. |
| ##defined structure | | DATA STRUCTURE BY TYPE |

FIG. 20

```
<segment_sequence>
  <segment segment_number="1" time_unit="pts">
    <start_time>12000</start_time>
    <end_time>15000</end_time>
    <command destination="receiver" action="excute">
       <application id="1" url="xxx.com/yyy" expire_date="2011-01-21">
    </command>
  </segment>
  <segment segment_number="2" time_unit="pts">
    <start_time>13000</start_time>
    <end_time>13100</end_time>
    <command> destination="receiver" action="event">
       <application id="1">
       <event id="event1">
    </command>
  </segment>
</segment_sequence>
```

FIG. 23

```
<?xml version=‘1.0’ encoding=“UTF-8”?>
<eri>

        ・・・

    <app_control_info control_type=“stream”>
        <app_control_position>audio_es</app_control_position>
    </app_control_info>
</eri>
```

FIG.25

| Syntax | No. of bits | Mnemonic |
| --- | --- | --- |
| data_stream_element() | | |
| { | | |
| element_instance_tag; | 4 | uimsbf |
| data_byte_align_flag; | 1 | uimsbf |
| cnt=count; | 8 | uimsbf |
| if(cnt==255){ | | |
| cnt+=esc_count; | 8 | uimsbf |
| } | | |
| if(data_byte_align_flag){ | | |
| byte_alignment(); | | |
| } | | |
| for(i=0;i<cnt;i++){ | | |
| data_stream_byte[element_instance_tag][i]; | 8 | uimsbf |
| } | | |
| } | | |

FIG. 26

| Syntax | No. Bits | Format |
|---|---|---|
| App_command_data () { | | |
| command_id | 8 | uimsbf |
| destination | 8 | uimsbf |
| command_action | 8 | uimsbf |
| command_validity | 8 | uimsbf |
| application_id | 24 | uimsbf |
| app_url_length | 8 | Uimbsf |
| for (i=0; i<N; i++) { | | |
| app_url_byte | 8×N | bslbsf |
| } | | |
| if (command_code==1 \|\| command_code==2) { | | (register/execute) |
| app_type | 4 | uimsbf |
| persistent_priority | 2 | uimsbf |
| reserved | 2 | Uimsbf |
| app_expire_date | 32 | |
| } | | |

FIG.27

| Syntax | No. Bits | Format |
|---|---|---|
| if(command_code==3) { | | (Inject event) |
|     event_id | 16 | uimsbf |
|     event_embedded_data_length | 8 | uimsbf |
|     for(i=0;i<N;i++) { | | |
|         event_embedded_data_byte | 8×N | bslbf |
|     } | | |
|   } | | |
| } | | |

REPRODUCTION APPARATUS, REPRODUCTION METHOD, AND PROGRAM

CROSS-REFERENCE TO RELATED APPLICATION

This application claims the benefit of priority of Provisional Application Ser. No. 61/554,141, filed on Nov. 1, 2011, the entire content of which is incorporated herein by reference.

BACKGROUND

The present technology relates to a reproduction apparatus, a reproduction method, and a program and, more particularly, to a reproduction apparatus, a reproduction method, and a program that are configured to provide application programs that are executed in operative connection with content provided by a VOD (Video On Demand) service.

Reception apparatuses configured to receive digital television broadcast signals can provide application programs that are executed in response to broadcast content, such as digital television programs, by use of data broadcasting (refer to Japanese Patent Laid-open No. 2006-050237, for example).

SUMMARY

With the recent popularization of the Internet, there are reception apparatuses that can reproduce distribution content provided by VOD services. With this distribution content, too, it is predicted to execute application programs in operative connection therewith.

Currently, however, technologies for providing application programs to be executed in operative connection with distribution content have not yet established.

Therefore, the present technology addresses the above-identified and other problems associated with related-art methods and apparatuses and solves the addressed problems by providing a reproduction apparatus, a reproduction method, and a program that are configured to provide application programs to be executed in operative connection with contents provided by VOD services.

In carrying out the present technology and according to one embodiment thereof, there is provided a reproduction apparatus. This reproduction apparatus has a reproduction control information acquisition block configured to acquire reproduction control information for controlling reproduction of content; a reproduction block configured to reproduce, in accordance with the acquired reproduction control information, the content that is distributed; and a control block configured to control, in accordance with information associated with an application program to be executed in operative connection with the content obtained from the acquired reproduction control information, an operation of an application program that is executed in operative connection with the content being reproduced.

In the above-mentioned reproduction apparatus, the reproduction control information is specified with any one of a first type for controlling an operation of the application program in accordance with information directly written to the reproduction control information, a second type for controlling an operation of the application program in accordance with the application control information obtained from an information processing apparatus for providing application control information for controlling an operation of the application program, and a third type for controlling an operation of the application program in accordance with the application control information embedded in data of the content. The control block controls an operation of the application program in accordance with the specified type of the reproduction control information.

In the above-mentioned reproduction apparatus, if the first type is specified in the reproduction control information, then the control block launches the application program in accordance with reproduction start of the content and terminates the application program in accordance with reproduction end of the content.

In the above-mentioned reproduction apparatus, if the second type is specified in the reproduction control information, then the control block controls an operation of the application program in accordance with a command within a valid period indicative of a synchronous period for progression of the content identified by the application control information obtained from the information processing apparatus.

In the above-mentioned reproduction apparatus, the above-mentioned command is indicative of any one of acquisition and registration and acquisition and launch and event firing, suspend, and termination of the application program. The control block controls any one of acquisition and registration and acquisition and launch and event firing, suspend, and termination of the application program in accordance with the command.

In the above-mentioned reproduction apparatus, the above-mentioned valid period is identified by a PTS (Presentation Time Stamp) indicative of a progress position of the corresponding content.

In the above-mentioned reproduction apparatus, if the third type is specified in the reproduction control information, the control block controls an operation of the application program in accordance with a command indicated by the application control information embedded in an embed position identified by the reproduction control information.

In the above-mentioned reproduction apparatus, the above-mentioned command is indicative of any one of acquisition and registration and acquisition and launch and event firing, suspend, and termination of the application program. The control block controls any one of acquisition and registration and acquisition and launch and event firing, suspend, and termination of the application program in accordance with the command.

In the above-mentioned reproduction apparatus, the application control information is inserted in a DSE area in a frame structure of an audio stream encoded by AAC (Advanced Audio Coding).

The above-mentioned reproduction apparatus further has a reception block configured to receive a digital television broadcast signal.

The above-mentioned reproduction apparatus or the above-mentioned reception apparatus may be a standalone unit or a component block internal to one apparatus.

A reproduction method and a program according to still other embodiments of the present technology are a reproduction method and a program configured corresponding to the above-mentioned reproduction apparatus of one embodiment of the present technology.

In the above-mentioned reproduction apparatus, reproduction method, and program of one embodiment of the present technology, reproduction control information for controlling the reproduction of content is obtained, the distributed content is reproduced in accordance with the obtained reproduction control information, and an operation of the application program to be executed in operative connection with the content being reproduced is controlled in accordance with the information associated with the application program to be executed in operative connection with the content obtained from the obtained reproduction control information.

According to one embodiment of the present technology, an application program to be executed in operative connection with content provided by a VOD service can be provided.

BRIEF DESCRIPTION OF THE DRAWINGS

FIG. 6 shows an exemplary description of ERI of a reproduction control meta file;

FIG. 7 shows exemplary additional items of ERI of a reproduction control meta file;

FIG. 9 shows an exemplary description of a reproduction control meta file of direct control type;

FIG. 12 shows an exemplary description of ERI of a reproduction control meta file of file control type;

FIG. 15 shows an exemplary data structure of a segment data sequence;

FIG. 16 shows exemplary data structures of commands;

FIG. 17 shows exemplary data structures of commands;

FIG. 19 shows an exemplary structure of meta data;

FIG. 20 shows an exemplary description of a segment sequence;

FIG. 23 shows an exemplary description of ERI of a reproduction control meta file of stream control type;

FIG. 25 shows a specific arrangement of meta data to be inserted in an audio stream;

FIG. 26 shows an exemplary syntax of application control information;

FIG. 27 shows an exemplary syntax of application control information;

DETAILED DESCRIPTION OF THE PREFERRED EMBODIMENTS

This technology will be described in further detail by way of embodiments thereof with reference to the accompanying drawings.

[Exemplary Configuration of a Broadcasting System]

Figure 1:
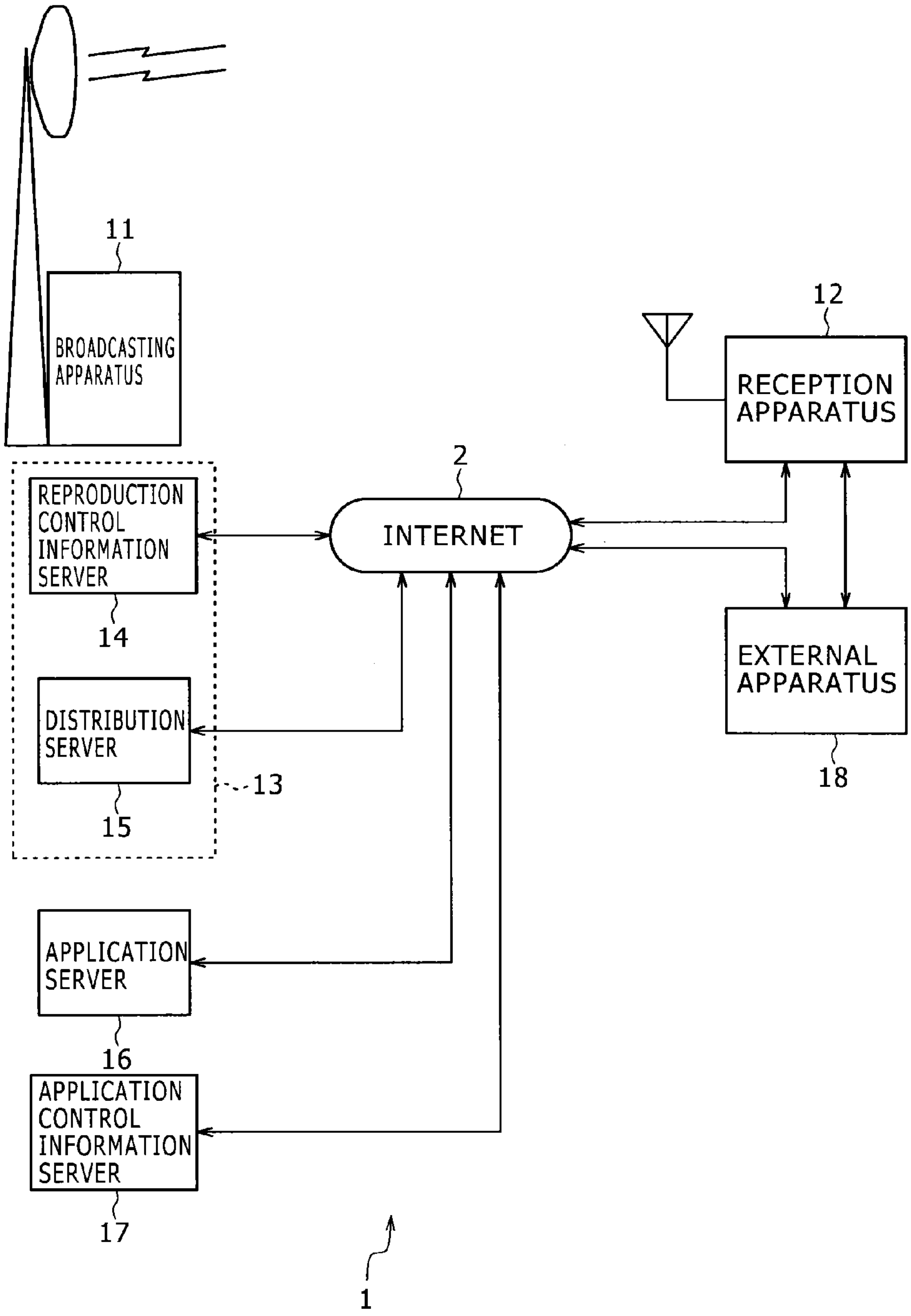
FIG. 1 is a schematic diagram illustrating an exemplary configuration of a broadcasting system.

Now, referring to FIG. 1, there is shown an exemplary configuration of a broadcasting system.

A broadcasting system 1 is made up of a broadcasting apparatus 11, a reception apparatus 12, a content server 13, an application server 16, and an application control information server 17. The content server 13 has a reproduction control information server 14 and a distribution server 15.

The reception apparatus 12, the reproduction control information server 14, the distribution server 15, the application server 16, and the application control information server 17 are interconnected via the Internet 2. An external apparatus 18 is connected to the reception apparatus 12 as required and connectable to the application server 16 via the Internet 2.

The broadcasting apparatus 11 is configured to broadcast (or transmit) digital television broadcast signals via a terrestrial digital broadcasting network for example. By these digital television broadcast signal, broadcast content including digital television programs and CMs is transmitted.

The reception apparatus 12 receives a digital television broadcast signal transmitted from the broadcasting apparatus 11 to obtain the video and audio of a digital television program. The reception apparatus 12 outputs the obtained video to a display (a display 52 shown in FIG. 2 to be described later) and outputs the obtained audio to a speaker (a speaker 51 shown in FIG. 2 to be described later).

The reception apparatus 12 also can receive distribution content distributed from the distribution server 15 to reproduce the received content. If the reproduction of the distribution content is specified by the user, the reception apparatus 12 requests the reproduction control information server 14 for a reproduction control meta file via the Internet 2.

The reproduction control information server 14 manages a reproduction control meta file. The reproduction control meta file herein denotes control information for controlling the reproduction of distribution content. In addition, a reproduction control meta file describes information associated with an application program (hereafter referred to as a VOD application) to be executed in operative connection with distribution content. It should be noted that details of a reproduction control meta file will be described later with reference to FIGS. 4 through 7.

In response to an inquiry from the reception apparatus 12, the reproduction control information server 14 transmits a reproduction control meta file to the reception apparatus 12 via the Internet 2.

In response to the reproduction control meta file from the reproduction control information server 14, the reception apparatus 12 requests the distribution server 15 for distribution content via the Internet 2.

The distribution server 15 stores and manages one or more pieces of distribution content. In response to an inquiry from the reception apparatus 12, the distribution server 15 transmits (or distributes) distribution content to the reception apparatus 12 via the Internet 2.

It should be noted that the reproduction control information server 14 and the distribution server 15 are provided by a business entity that provides VOD services to distribute distribution content, for example. Therefore, the reproduction control information server 14 and the distribution server 15 may not only be configured separately but also be configured integrally as the content server 13.

In response to the information written to the obtained reproduction control meta file, the reception apparatus 12 requests the application server 16 for a VOD application via the Internet 2. The reception apparatus 12 executes the VOD application received from the application server 16 in operative connection with the distribution content being reproduced.

The application server 16 manages the VOD application that is executed in operative connection with distribution content. In response to an inquiry from the reception apparatus 12, the application server 16 transmits (or provides) the VOD application to the reception apparatus 12 via the Internet 2.

In addition, in response to the obtained reproduction control meta file, the reception apparatus 12 requests the application control information server 17 for application control information via the Internet 2.

The application control information server 17 manages control information (hereafter referred to as application control information) for controlling an operation of a VOD application. In response to an inquiry from the reception apparatus 12, the application control information server 17 transmits (or provides) application control information to the reception apparatus 12 via the Internet 2.

In response to the application control information from the application control information server 17, the reception apparatus 12 requests the application server 16 for a VOD application via the Internet 2. The reception apparatus 12 executes the VOD application from the application server 16 in operative connection with the distribution content being reproduced.

At the same time, the distribution server 15 can transmit application control information as included in the data of distribution content. To be more specific, application control information is transmitted as arranged in a transport stream (hereafter referred to as a TS) of distribution content or as embedded in a video signal or an audio signal.

The reception apparatus 12 obtains the application control information included in the data of distribution content received from the distribution server 15. In response to the obtained application control information, the reception apparatus 12 requests the application server 16 for a VOD application via the Internet 2. The reception apparatus 12 executes the VOD application received from the application server 16 in operative connection with the distribution content being reproduced.

The reception apparatus 12 is connected to the external apparatus 18 in a wireless or wired manner. The reception apparatus 12 transfers a command to be transmitted to the external apparatus 18 of the commands indicated by the obtained application control information to the external apparatus 18. In response to the command received from the reception apparatus 12, the external apparatus 18 obtains a VOD application from the application server 16 and executes the obtained VOD application.

It should be noted that the reception apparatus 12 may be arranged as a standalone apparatus or incorporated in a digital television receiver or a video recorder, for example. In the example shown in FIG. 1, it was described that the reception apparatus 12 has both the reception function for receiving a digital television broadcast signal of broadcast content and the reproduction function for reproducing distribution content in a streaming manner; however, the reception function need not always be arranged, so that the reception apparatus 12 may be configured as a reproduction apparatus having only the reproduction function.

For the external apparatus 18, a so-called smart phone, a portable information terminal, a personal computer, a tablet computer, a digital television receiver, or a video recorder may be used, for example.

The broadcasting system 1 is configured as follows.

[Exemplary Configuration of Reception Apparatus]

Figure 2:
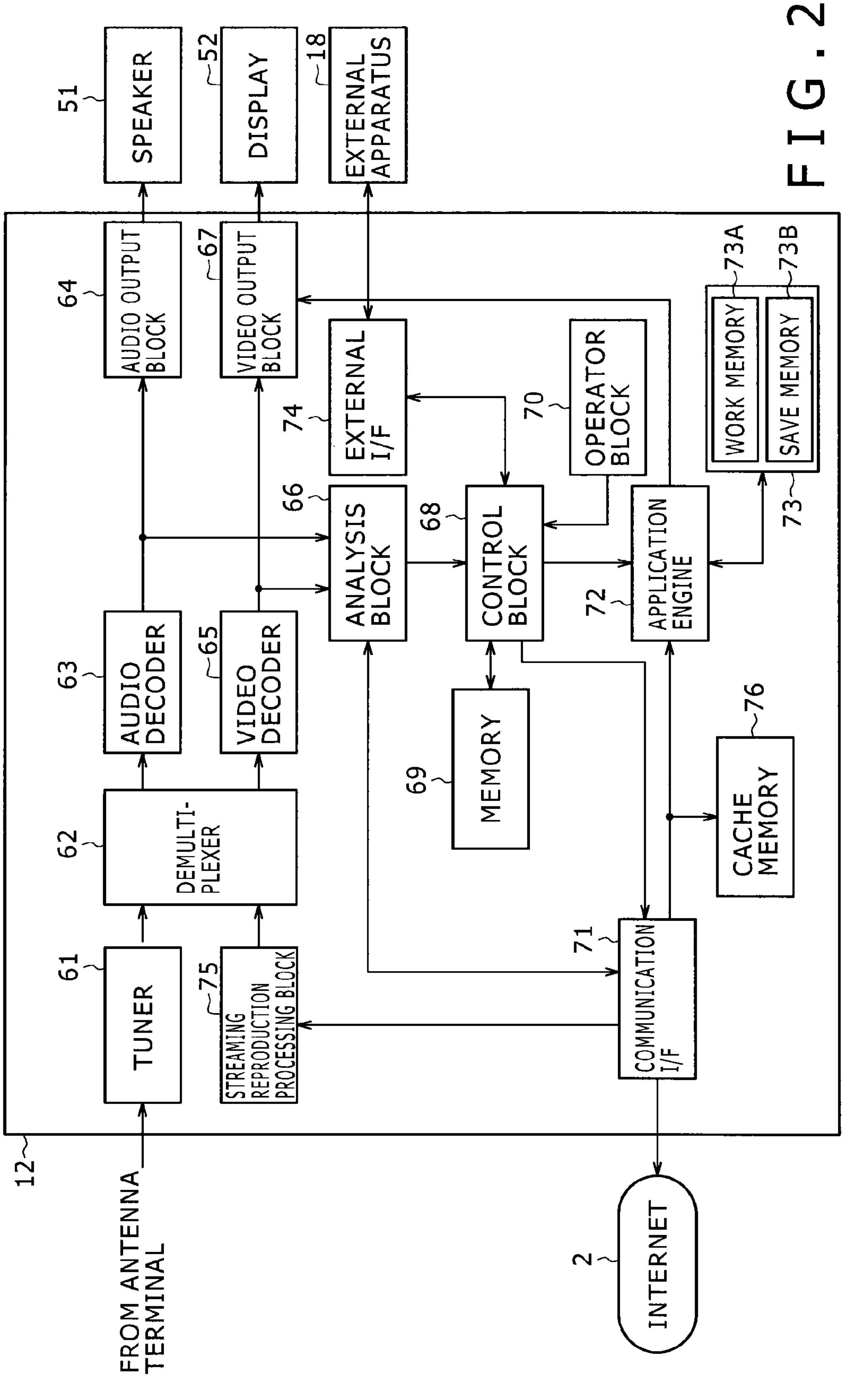
FIG. 2 is a block diagram illustrating an exemplary configuration of a reception apparatus.

Referring to FIG. 2, there is shown an exemplary configuration of the reception apparatus 12 shown in FIG. 1.

The reception apparatus 12 is made up of a tuner 61, a demultiplexer 62, an audio decoder 63, an audio output block 64, a video decoder 65, an analysis block 66, a video output block 67, a control block 68, a memory 69, an operator block 70, a communication I/F 71, an application engine 72, an application memory 73, an external I/F 74, a streaming reproduction processing block 75, and a cache memory 76.

The tuner 61 receives and demodulates a digital broadcast signal corresponding to a service (or a broadcast channel) selected by the user and supplies a TS obtained as a result of the demodulation to the demultiplexer 62.

The demultiplexer 62 separates an audio stream and a video stream from the TS supplied from the tuner 61 and supplies the audio stream to the audio decoder 63 and the video stream to the video decoder 65.

The audio decoder 63 decodes the audio stream supplied from the demultiplexer 62 and supplies an audio stream obtained as a result of the decoding to the audio output block 64 and the analysis block 66. The audio output block 64 outputs an audio signal corresponding to the audio stream supplied from the audio decoder 63 to the speaker 51.

The video decoder 65 decodes the video stream supplied from the demultiplexer 62 and supplies a video stream obtained as a result of the decoding to the analysis block 66 and the video output block 67. The video output block 67 outputs a video signal corresponding to the video stream supplied from the video decoder 65 to the display 52.

The analysis block 66 controls the communication I/F 71 to obtain a reproduction control meta file from the reproduction control information server 14. The analysis block 66 analyzes the obtained reproduction control meta file and supplies a result of the analysis to the control block 68.

Also, in accordance with the analysis result of the reproduction control meta file, the analysis block 66 controls the communication I/F 71 to obtain application control information from the application control information server 17. The analysis block 66 analyzes the obtained application control information and supplies a result of the analysis to the control block 68.

Further, in accordance with the analysis result of the reproduction control meta file, the analysis block 66 obtains the application control information from the audio stream or the video stream while normally monitoring the audio stream from the audio decoder 63 or the video stream from the video decoder 65.

The control block 68 controls the operations of other component blocks of the reception apparatus 12 by executing a control program recorded to the memory 69. The memory 69 stores the control program to be executed by the control block 68. This control program can be updated on the basis of update data supplied via a digital broadcast signal or the Internet 2.

The operator block 70 receives various operations done by the user and relates operation signals thereto to notify the control block 68 of these operation signals. In accordance with operation signals from the operator block 70, the control block 68 controls the communication I/F 71 to transfer information between servers connected to the Internet 2.

In addition, in accordance with the analysis result received from the analysis block 66, the control block 68 controls the application engine 72. To be more specific, in accordance with a command indicated by the analysis result from the analysis block 66, the control block 68 controls registration, launch, event fire, suspend, or termination of a VOD application.

Under the control of the analysis block 66, the control block 68, or the application engine 72, the communication I/F 71 connects to the reproduction control information server 14, the distribution server 15, the application server 16, or the application control information server 17 via the Internet 2.

Under the control of the control block 68, the application engine 72 reads a VOD application from the cache memory 76 and executes this application. The video output block 67 synthesizes a video signal of the video of the VOD application supplied from the application engine 72 with a video signal supplied from the video decoder 65 and outputs a resultant synthesized signal to the display 52.

The application memory 73 is made up of a work memory 73A and a save memory 73B. The application engine 72 records the data (to be more specific, the data including layers of information being displayed) associated with the active VOD application to the work memory 73A. In addition, if the active VOD application is suspended, the application engine 72 moves the data from the work memory 73A of the application memory 73 to the save memory 73B. Then, if the suspended VOD application is resumed, the application engine 72 moves the data from the save memory 73B to the work memory 73A to restore the status as it was before the suspension.

Under the control of the control block 68, the external I/F 74 establishes connection with the external apparatus 18 in a wireless or wired manner. The external I/F 74 outputs a command to be transmitted to an external apparatus to the external apparatus 18 connected to the external I/F 74.

The streaming reproduction processing block 75 executes processing necessary for streaming reproduction on the data of distribution content supplied from the communication I/F 71 and supplies a TS obtained by this processing to the demultiplexer 62.

The demultiplexer 62 separates an audio stream and a video stream from the TS supplied from the tuner 61 or the streaming reproduction processing block 75 and supplies the obtained audio stream to the audio decoder 63 and the obtained video stream to the video decoder 65. Consequently, the supplied audio stream and video stream are decoded by the audio decoder 63 and the video decoder 65, respectively to execute the stream reproduction of the distribution content.

The reception apparatus 12 is configured as follows.

[Exemplary Configuration of External Apparatus]

Figure 3:
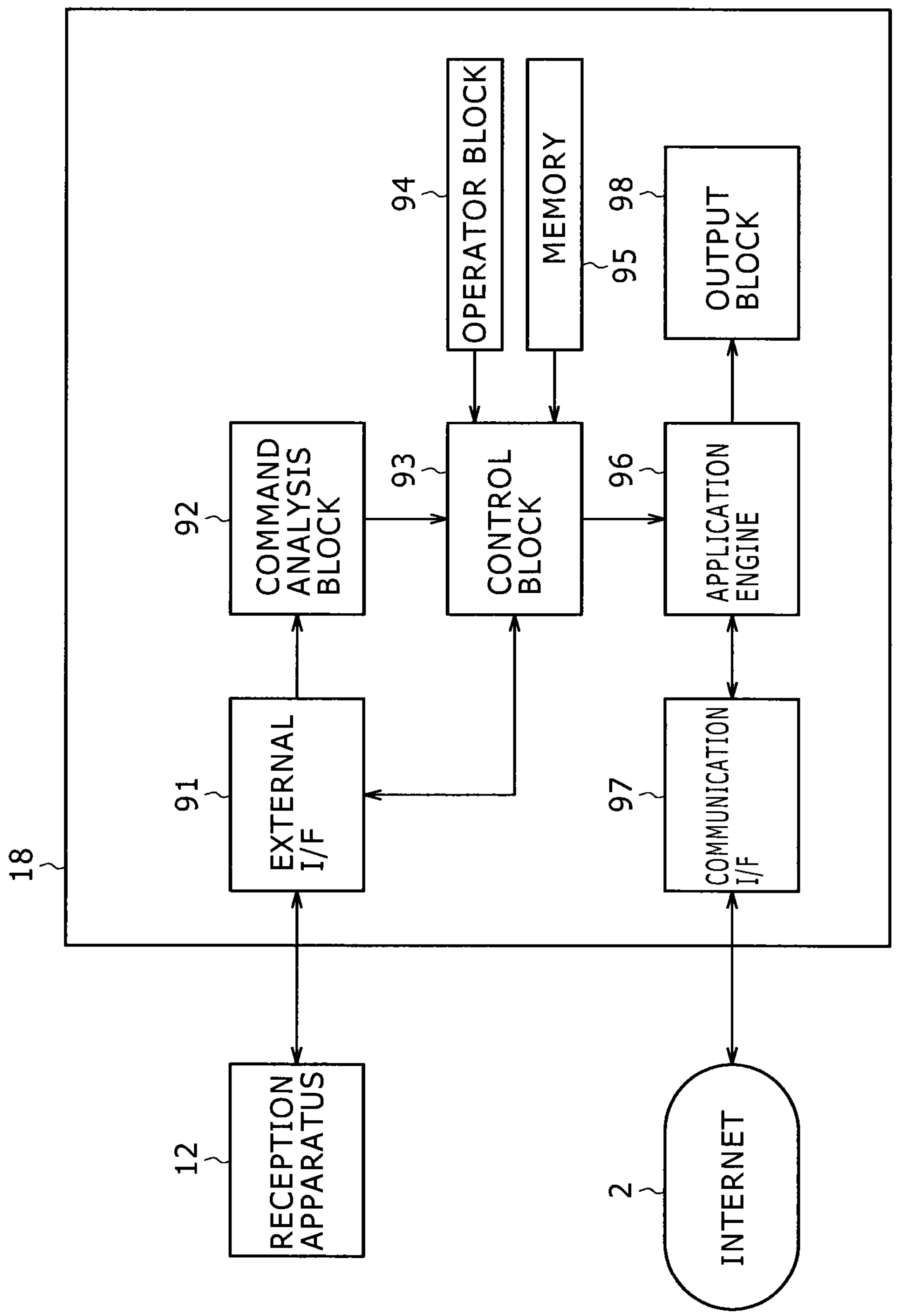
FIG. 3 is a block diagram illustrating an exemplary configuration of an external apparatus.

Referring to FIG. 3, there is shown an exemplary configuration of the external apparatus 18 shown in FIG. 1.

The external apparatus 18 is made up of an external I/F 91, a command analysis block 92, a control block 93, an operator block 94, a memory 95, an application engine 96, a communication I/F 97, and an output block 98.

The external I/F 91 is connected to the external I/F 74 of the reception apparatus 12 in a wireless or wired manner to receive a command addressed to the external apparatus transmitted from the reception apparatus 12. The external I/F 91 supplies the received command to the command analysis block 92.

The command analysis block 92 analyzes the command addressed to the external apparatus supplied from the external I/F 91 and supplies a result of the analysis to the control block 93.

The control block 93 executes a control program stored in the memory 95 to control operations of the other component blocks of the external apparatus 18. In addition, in accordance with a command addressed to the external apparatus supplied from the command analysis block 92, the control block 93 controls acquisition, registration, launch, event fire, suspend, or termination of the VOD application.

The operator block 94 receives various operations done by the user and supplies operation signals corresponding to the received operations to the control block 93.

Under the control of the control block 93, the application engine 96 obtains a VOD application from the application server 16 via the communication I/F 97 and the Internet 2 and executes the obtained VOD application. A video signal and an audio signal, obtained as a result of the execution, of the VOD application associated with the distribution content being reproduced by the reception apparatus 12 are supplied to the output block 98.

Under the control of the application engine 96, the communication I/F 97 is connected to the application server 16 via the Internet 2 to obtain the VOD application.

The output block 98 displays a video corresponding to the video signal of the VOD application supplied from the application engine 96 and outputs the audio corresponding to the audio signal.

The external apparatus 18 is configured as follows.

[Details of Reproduction Control Meta File]

Figure 4:
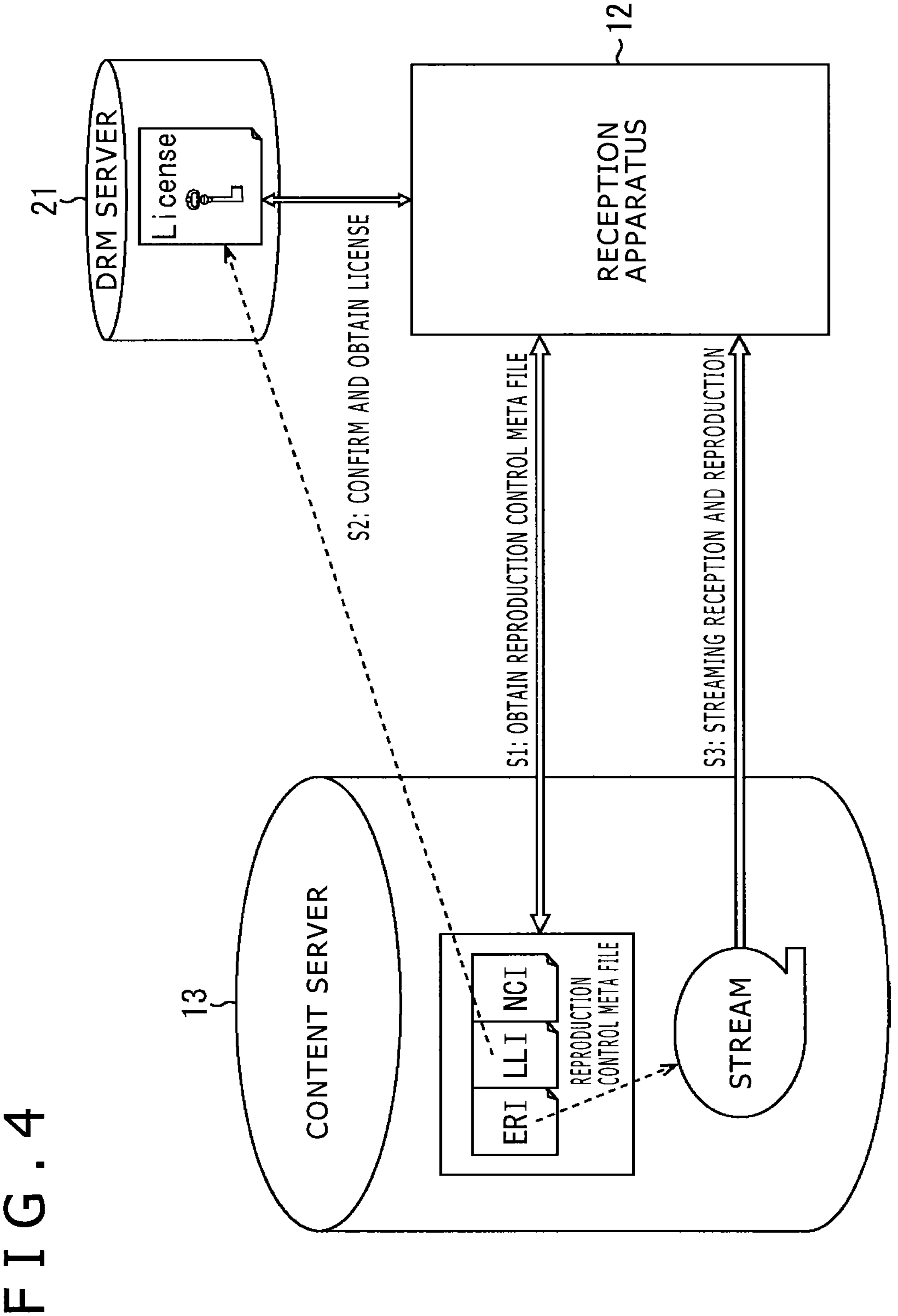
FIG. 4 is a schematic diagram illustrating flows of streaming reproduction of distribution content.

Referring to FIG. 4, there is shown a flow of processing to be executed by the reception apparatus 12, in which a reproduction control meta file is obtained from the content server 13 and, in accordance with the obtained reproduction control meta file, streaming reproduction of distribution content is executed.

As shown in FIG. 4, when the reproduction of distribution content is specified by the user, the reception apparatus 12 requests the content server 13 for a reproduction control meta file to obtain the same (S1). In accordance with the obtained reproduction control meta file, the reception apparatus 12 accesses a DRM (Digital Rights Management) server 21 shown in FIG. 4 for the inquiry of a license of the distribution content to be streaming-reproduced (S2). It should be noted that, although not shown in the exemplary configuration shown in FIG. 1, the DRM server 21 executes digital rights management on distribution content.

Next, upon obtaining a license issued by the DRM server 21, the reception apparatus 12 starts receiving distribution content distributed by the content server 13. Consequently, the streaming reproduction is executed on the distributed content in the reception apparatus 12 (S3).

Figure 5:
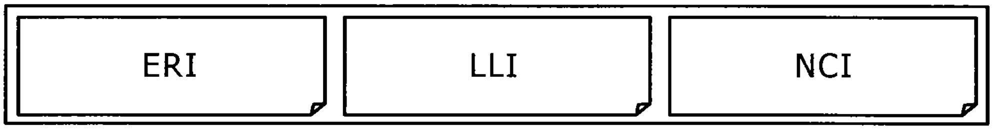
FIG. 5 is a schematic diagram illustrating an exemplary structure of a reproduction control meta file.

The following describes details of a reproduction control meta file that is managed by the content server 13 (or the reproduction control information server 14) with reference to FIGS. 5 through 7.

Referring to FIG. 5, there is shown an exemplary structure of a reproduction control meta file.

As shown in FIG. 5, a reproduction control meta file is made up of ERI (Entry Resource Information), LLI (License Link Information), and NCI (Network content Control Information). ERI describes control information for controlling the reproduction of distribution content and information associated with a VOD application.

LLI describes information associated with a license of distribution content. NCI describes information associated with parameters necessary for streaming reproduction.

Referring to FIG. 6, there is shown an exemplary description of ERI of a reproduction control meta file. ERI is written by XML (Extensible Markup Language) for example.

As shown in FIG. 6, ERI is made up of a header element, a startup element, content_chapter_info_element, and ES_info element. Between the start and end tags of the header element, an encryption element associated with the encryption of distribution content is described in addition to a date element and a time element associated with date and time.

Between the start and end tags of the startup element, a start element associated with the URL (Uniform Resource Locator) of the distribution server 15 is described in addition to a content_title element, a content_abstract element, and a duration element associated with the title, content, and time length of distribution content. Between the start and end tags of a content_chapter_info element, a chapter_point element and a chapter_title element associated with the temporal location and title of each chapter of distribution content are described.

Between the start and end tags of the ES_info element, information associated with ES (Elementary Stream) is described. To be more specific, information including video attributes such as resolution and encoding method, audio channel attributes such as ES number and mode, and subtitle attributes such as audio channel titles of main audio and sub audio and language is described.

As described above, ERI mainly describes the information necessary for the reproduction of distribution content; the ERI of the reproduction control meta file to which the technology according to the present disclosure is applied further describes such information associated with a VOD application as shown in FIG. 7.

To be more specific, as shown in FIG. 7, the ERI of a reproduction control meta file is made up of an app_control_info element in addition to the header element, the startup element, the content_chapter_info element, and the ES_info element shown in FIG. 6. The app_control_info element describes the information associated with a VOD application.

For the attribute of the app_control_info element, a control_type attribute is specified. The control_type attribute is an attribute for specifying a control type indicative of how to control a VOD application. For the control_type attribute, any one of control types, direct, file, and stream, is specified.

It should be noted that, in the following description, control types specified with direct, file, and stream as control_type attributes will be described as a direct control type, a file control type, and a stream control type, respectively.

Between the start and end tags of the app_control_info element, an app_id element, an app_type element, an app_url element, a destination element, an expire_date element, an app_control_url element, and an app_control_position element are written.

The elements, an app_id element through an expire_date element, are specified only in the case of direct control type. For an app_id element, the identification information for a VOD application corresponding to the reproduction control meta file concerned is specified. For an app_type element, the information indicative of the type of the VOD application corresponding to the reproduction control meta file concerned, such as HTML (HyperText Markup Language), is specified, for example.

For an app_url element, the URL of the acquisition destination of a VOD application is specified. For a destination element, the acquisition destination of a VOD application, such as the reception apparatus main or the external apparatus, for example, is specified. For an expire_date element, the information indicative of the valid period (or the expiration date) of a VOD application is specified.

An app_control_url element is specified only in the case of file control type. For an app_control_url element, the URL of the acquisition destination of application control information is specified.

An app_control_position element is specified only in the case of stream control type. For an app_control_position element, the information indicative of a position at which application control information is embedded (or an insertion position) is specified. For example, for an app_control_position element, audio_es for embedding application control information into an audio stream or video_es for embedding application control information into a video stream is specified.

As described above, the ERI of a reproduction control meta file to which the technology according to the present disclosure is applied describes the elements and attributes shown in FIG. 7 in addition to the elements and attributes shown in FIG. 6. The reception apparatus 12 controls the operation of a VOD application in accordance with the control type specified by the control_type attribute of the app_control_info element written to the ERI. Therefore, the following describes operations of the reception apparatus 12 when the reception apparatus 12 operates in direct control type, file control type, and stream control type, in this order.

[Exemplary Operation in Direct Control Type]

First, with reference to FIGS. 8 through 10, the case in which the reception apparatus 12 operates in direct control type will be described.

(Linkage between Apparatuses of Direct Control Type)

Figure 8:
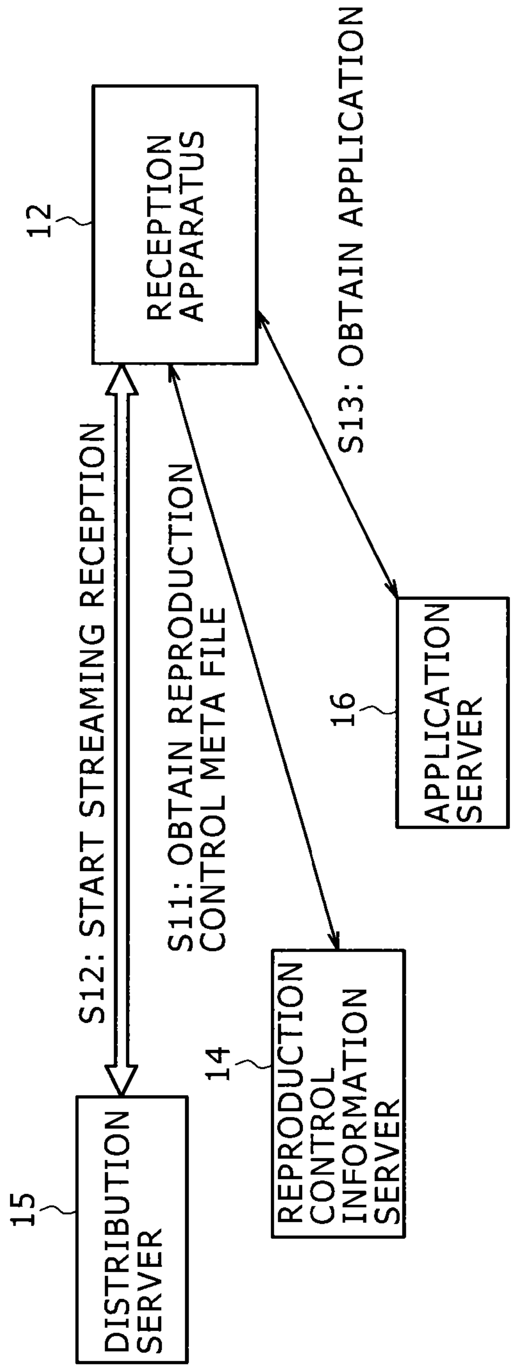
FIG. 8 is a schematic diagram illustrating the operative connection between apparatuses when a reception apparatus operates in direct control type.

Referring to FIG. 8, there is shown the linkage between apparatuses when the reception apparatus 12 operates in direct control type.

As shown in FIG. 8, when the reproduction of distribution content is specified by the user, the reception apparatus 12 accesses the reproduction control information server 14 to obtain a reproduction control meta file (S11). Next, in accordance with the obtained reproduction control meta file, the reception apparatus 12 accesses the distribution server 15 to start the reception of distribution content distributed from the distribution server 15 (S12).

At the same time, the reception apparatus 12 analyzes the obtained reproduction control meta file to operate in direct control type if the control_type attribute of the app_control_info element of ERI is indicative of direct.

For example, as shown in FIG. 9, in the ERI of a reproduction control meta file of direct control type, direct is specified for the control_type attribute of the app_control_info element and an app_id element, an app_type element, app_url element, and an expire_date element are specified. An app_url element describes the URL of the application server 16 for example.

Referring to FIG. 8 again, in accordance with the ERI (the app_url element) of the reproduction control meta file, the reception apparatus 12 accesses the application server 16 to obtain a VOD application (S13). Thus, in the reception apparatus 12, an operation of direct control type is executed to execute the VOD application obtained from the application server 16 in operative connection with the distribution content from the distribution server 15.

It should be noted that, in the description with reference to FIG. 8, the case in which a VOD application is obtained after the reception of distribution content is started; it is also practicable to start the reception of distribution content after a VOD application is obtained. Namely, the processing steps S12 and S13 shown in FIG. 8 may be reversed to execute the processing step of S12 after the processing step of S13.

(Exemplary Operation of VOD Application of Direct Control Type)

Figure 10:
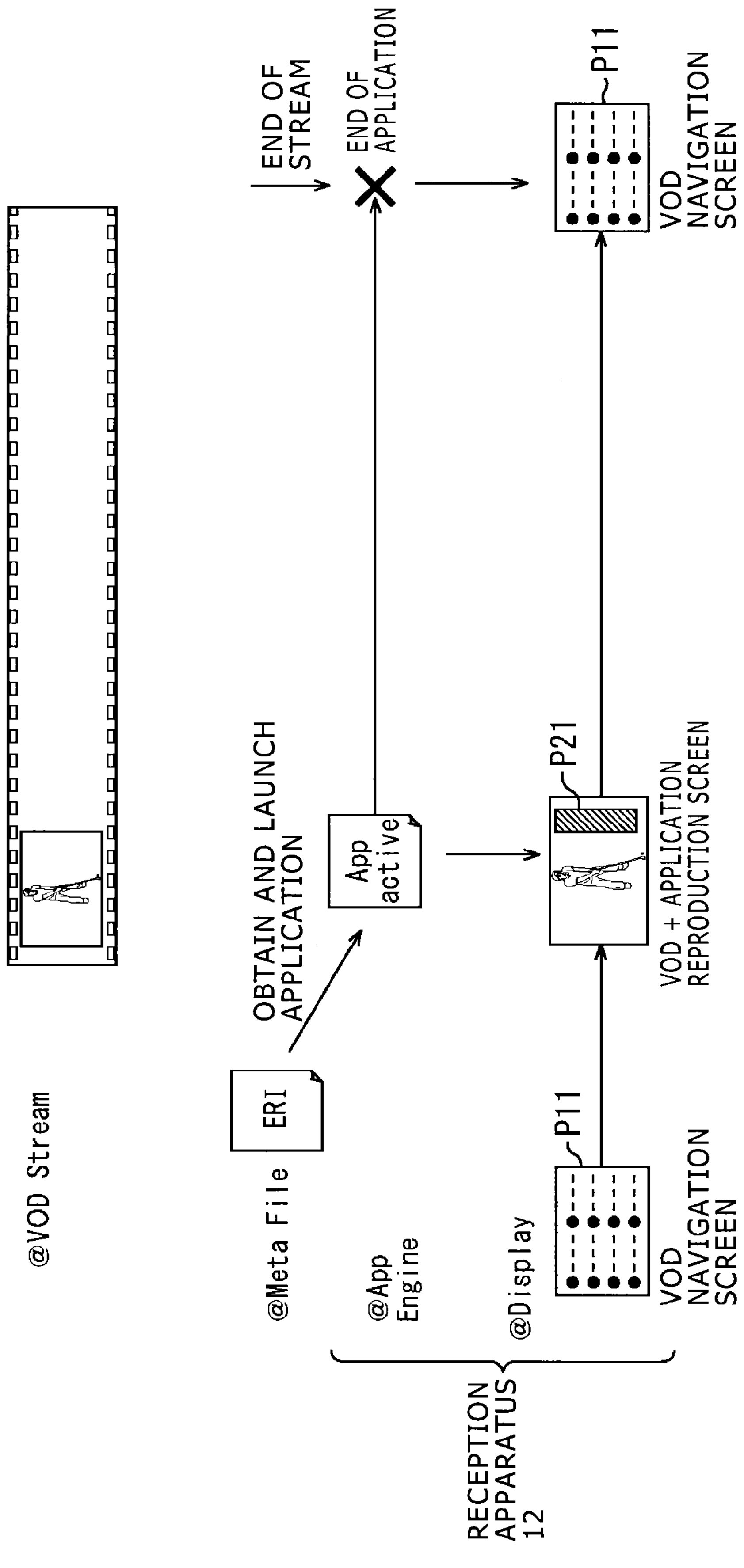
FIG. 10 is a schematic diagram illustrating an exemplary operation scenario of an application for VOD in direct control command.

In the reception apparatus 12, executing an operation of direct control type enables the operation of a VOD application as shown in FIG. 10 for example.

Referring to FIG. 10, there is shown an example of an operation scenario of a VOD application in direct control type.

As shown in FIG. 10, if a particular piece of distribution content has been selected from a list of a VOD navigation screen P11 displayed on the display 52, then the reception apparatus 12 requests the reproduction control information server 14 of a reproduction control meta file corresponding to the selected distribution content. At the same time, in accordance with the reproduction control meta file received from the reproduction control information server 14, the reception apparatus 12 requests the distribution server 15 for the selected distribution content, thereby starting the reception of the requested distribution content.

In addition, in accordance with the obtained reproduction control meta file, the reception apparatus 12 obtains the VOD application from the application server 16 and starts the obtained VOD application. Consequently, a video with video P21 of the VOD application superimposed on the video of the distribution content is displayed on the display 52.

Next, in the reception apparatus 12, while the streaming reproduction of the distribution content is executed, the video of the distribution content with video P21 of the VOD application superimposed is displayed on the display 52. When the streaming-reproduced distribution content comes to an end, the VOD application is terminated with the distribution content in the reception apparatus 12, thereby displaying the VOD navigation screen P11 on the display 52 again.

As described above, if the reception apparatus 12 operates in direct control type, the reception apparatus 12 controls a VOD application by use of the information associated with the VOD application directly written to the ERI of a reproduction control meta file. In this case, a VOD application is obtained and started in conformity to the starting of the streaming reproduction of distribution content and superimposed on the distribution content to be displayed. If the streaming reproduction of distribution content comes to an end, the VOD application superimposed on the distribution content is terminated at the same time.

[Exemplary Operation of File Control Type]

The following describes an example in which the reception apparatus 12 operates in file control type with reference to FIGS. 11 through 21.

(Operative Connection between Apparatuses of File Control Type)

Figure 11:
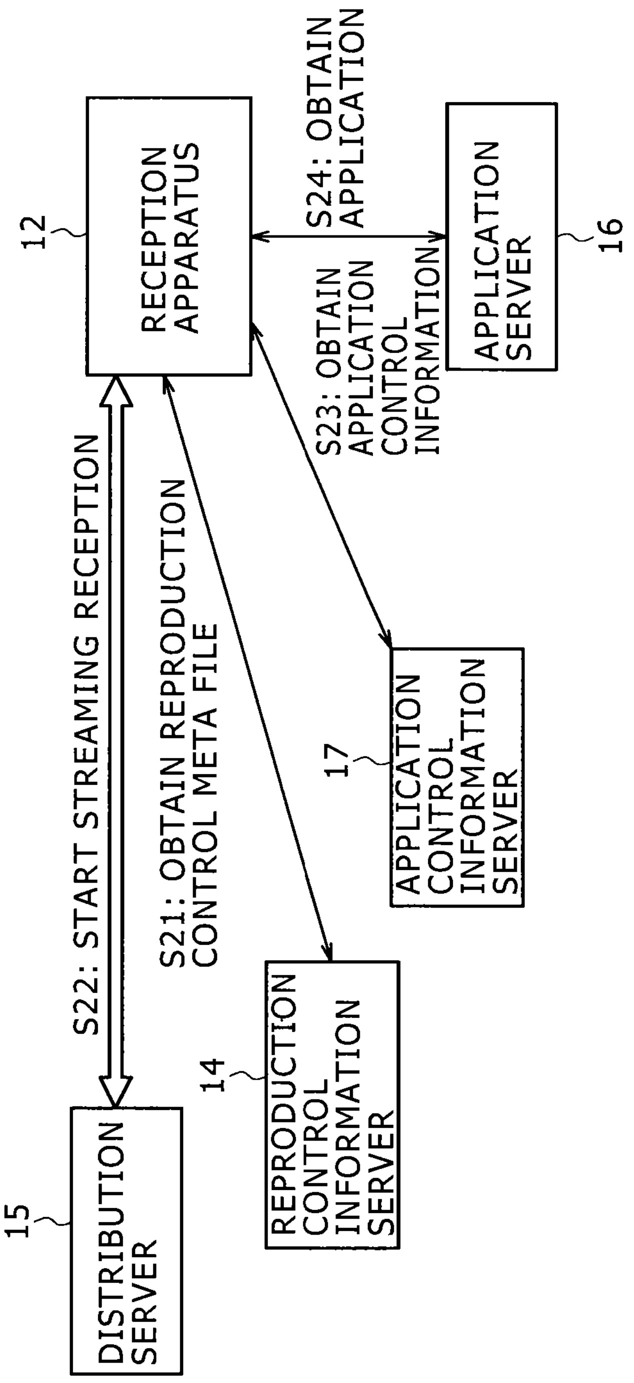
FIG. 11 is a schematic diagram illustrating operative connection between apparatuses when a reception apparatus operates in file control type.

Referring to FIG. 11, there is shown an operative connection between apparatuses if the reception apparatus 12 operates in file control type.

As shown in FIG. 11, when the reproduction of distribution content is specified by the user, the reception apparatus 12 accesses the reproduction control information server 14 to obtain a reproduction control meta file (S21). Next, in accordance with the obtained reproduction control meta file, the reception apparatus 12 accesses the distribution server 15 to start the reception of the distribution content to be distributed from the distribution server 15 (S22).

At the same time, the reception apparatus 12 analyzes the obtained reproduction control meta file and operates in file control type if the control_type attribute of the app_control_info element of the ERI is indicative of file.

For example, as shown in FIG. 12, in the ERI of reproduction control meta file of file control type, file is specified for the control_type attribute of the app_control_info element and an app_control_url element is specified. For the app_control_url element, the URL of the application control information server 17 is specified.

Referring to FIG. 11 again, in accordance with the ERI (the app_control_url element) of the reproduction control meta file, the reception apparatus 12 accesses the application control information server 17 to obtain application control information (S23). Next, in accordance with a command within an valid period indicative of a synchronization period for the progress of the distribution content identified by the application control information obtained from the application control information server 17, the reception apparatus 12 accesses the application server 16 to obtain a VOD application and launches the obtained VOD application (S24). At the same time, in the reception apparatus 12, the active VOD application is suspended, resumed, event-fired, or terminated in accordance with the command within the valid period indicated by the application control information.

As described above, in the reception apparatus 12, a VOD application obtained from the application server 16 is executed in operative connection with the distribution content obtained from the distribution server 15 when the operation of file control type is executed.

It should be noted that, in the description with reference to FIG. 11, the case in which a VOD application is obtained after the reception of distribution content is started; it is also practicable to start the reception of distribution content after a VOD application is obtained. Namely, the processing steps S22 and S23 shown in FIG. 11 may be reversed to execute the processing step of S22 after the processing steps of S23 and S24.

(Details of Application Control Information)

The following describes the application control information to be provided from the application control information server 17 to the reception apparatus 12 with reference to FIGS. 13 through 20.

Figure 13:
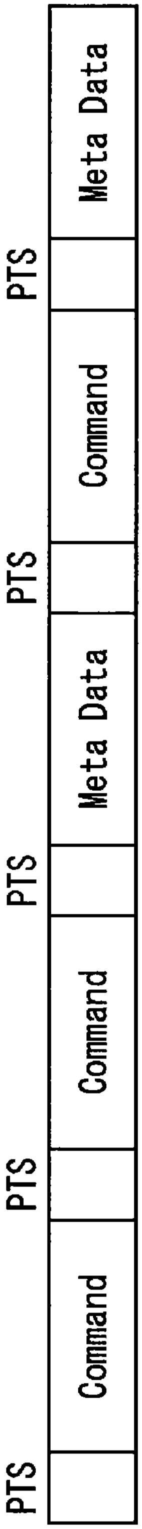
FIG. 13 shows an exemplary structure of a segment data sequence.

Referring to FIG. 13, there is shown an exemplary structure of a segment data sequence.

As shown in FIG. 13, application control information is configured as a segment data sequence made up of two or more pieces of segment data delimited by the information indicative of a specific timing such as PTS (Presentation Time Stamp). The segment data is one of command data and meta data. If the segment data is command data, then various kinds of information associated with commands for controlling the operation of a VOD application are included. If the segment data is meta data, then various kinds of information associated with segments are included.

Figure 14A:
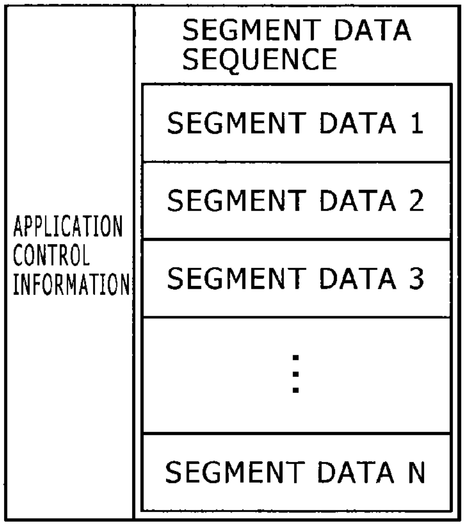
FIGS. 14A, 14B, and 14C show exemplary structures of application control information.
Figure 14B:
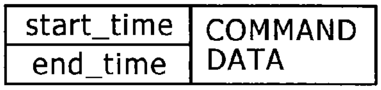
Figure 14C:
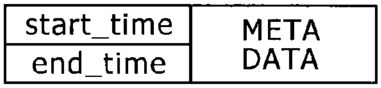

Referring to FIGS. 14A to 14C, there is shown an exemplary structure of application control information. As shown in FIG. 14A, the application control information includes a segment data sequence made up of two or more pieces of segment data.

Each piece of segment data is made up of a segment valid period and command data (FIG. 14B) or a segment valid period and meta data (FIG. 14C).

The segment valid period is indicated by start_time and end_time indicative of two points on the progress time axis of the corresponding distribution content; if the progress timing of distribution content is within the segment valid period, the segment data concerned is valid and, if the progress timing of distribution content is before or after the segment valid period, the segment data concerned is invalid.

One piece of application control information (a segment data sequence) can contain the segment data including command data and the segment data including meta data at the same time.

FIGS. 15 through 19 show detail examples of data structures of a segment data sequence. It should be noted that each data structure is assumed to be written by XML; an item having "@" is indicative of an attribute accompanying an upper element and other items are indicative of elements.

Referring to FIG. 15, there is shown a data structure of a segment data sequence. For the segment_sequence element, a segment_number attribute indicative of the number of segment data (segment) and a time_unit attribute indicative of a method of specifying segment valid period are specified. For the time_unit attribute, utc is specified if absolute date based on hour, minute, and second is used, smpte is specified if relative time from the start of distribution content is used, and pts is specified if a PTS value is used. It should be noted that, for a PTS value, a counter value of a 90 KHz clock embedded in a video stream and an audio stream can be used.

For a start_time element, a segment start timing is specified. For an end_time element, a segment end timing is specified. In addition, each piece of segment data describes one of command data and meta data.

FIGS. 16 and 17 show command data structures in segment data.

The command elements include a diffusion element, an application element, and an event element in addition to a destination attribute and an action attribute.

For the destination attribute, a device subject to VOD application control by a command concerned is specified. For example, for the destination attribute, receiver is specified if the device subject to a command is the reception apparatus main and external_1 or external_2 is specified if the device subject to a command is an external device.

The action attribute indicates whether the command concerned is execute, register, suspend, terminate, or event.

An execute command is used to instruct the reception apparatus 12 to obtain or launch a VOD application.

A register command is used to instruct the reception apparatus 12 to obtain or register a VOD application. The registration of a VOD application herein denotes the storing of the valid period and valid scope of an obtained VOD application by relating the valid period and valid scope therewith. Consequently, the VOD application is managed in accordance with the valid period and valid scope thereof.

A suspend command is used to make the reception apparatus 12 suspend an active VOD application.

A terminate command is used to make the reception apparatus 12 terminate an active VOD application.

An event command is used to make the reception apparatus 12 fire an event in an active VOD application.

The diffusion element is a parameter for stochastically diffusing the timing of the application of a command concerned in a target device such as the reception apparatus 12. The attributes of the diffusion element include a rate attribute, range attribute, and period attribute, for which the number of distribution, a maximum delay time, and command application diffusion period are specified respectively.

Figure 18:
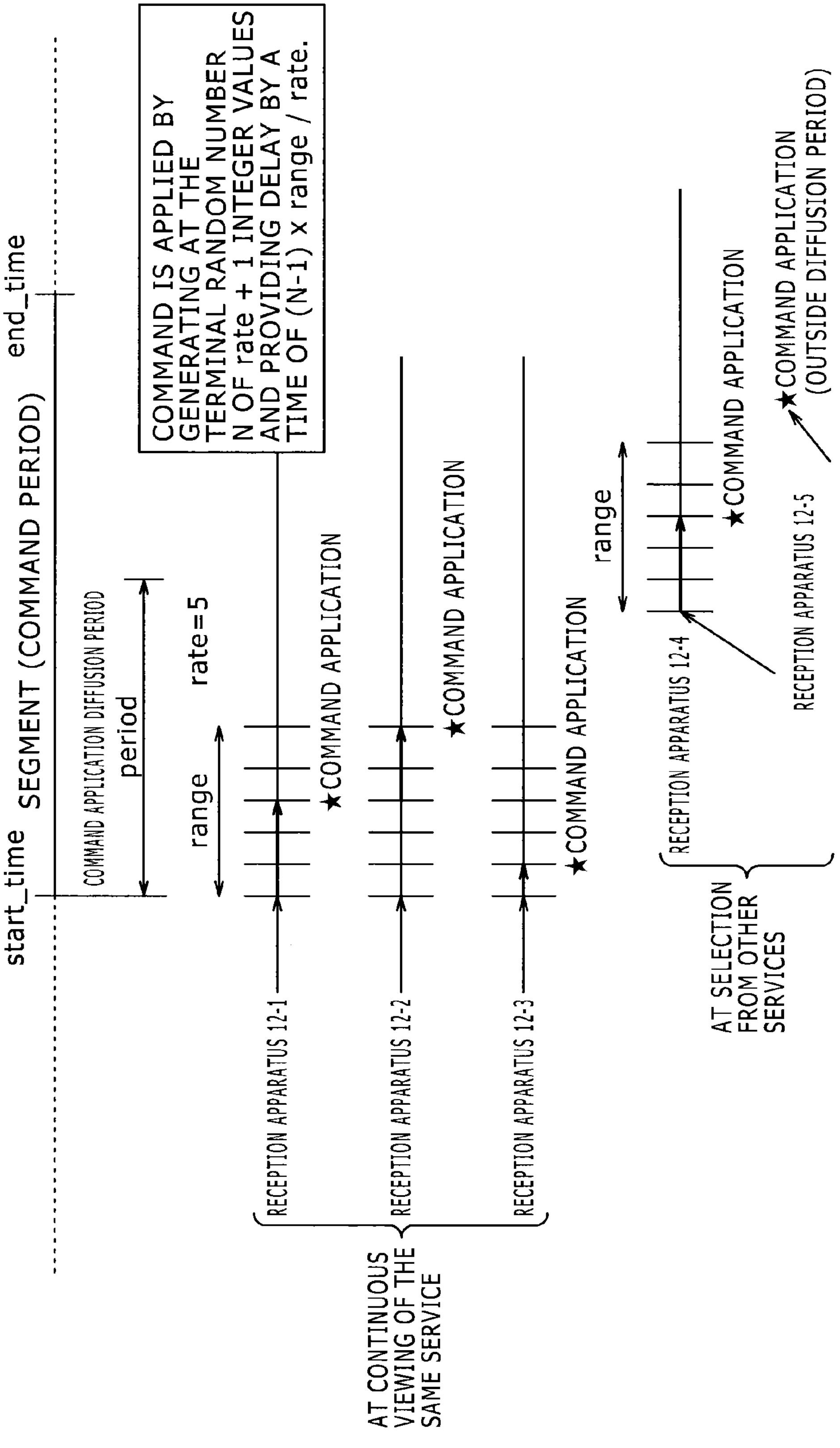
FIG. 18 shows details of diffusion of command application.

The following describes details of the diffusion of command application with reference to FIG. 18.

For example, if the reception apparatuses 12-1 through 12-3 that are executing streaming reproduction of the same distribution content obtain VOD applications from the application server 16 in response to a register command or a suspend command, accessing the application server 16 at the same time may overload the application server 16. In order to prevent this problem from happening, a rate attribute, a range attribute, and a period attribute are specified for the attributes of the diffusion element, thereby diffusing the access by two or more reception apparatuses 12 to the application server 16 for obtaining VOD applications.

For example, in the reception apparatuses 12-1 through 12-3, random values N are generated and command execution times are shifted by a duration of time by computing (N−1)× range/rate, thereby shifting the timings of accessing by each reception apparatus 12 to the application server 16. In the example shown in FIG. 18, rate=5. It should be noted that command execution times can also be shifted in the same manner as mentioned above for the reception apparatus 12-4 that is executing streaming reproduction of other distribution content. It should also be noted that the reception apparatus 12-5 that executes commands outside the command application diffusion period can immediately execute commands with the command execution time not delayed.

As described above, the timing of accessing by the reception apparatus 12 to the application server 16 is adjusted, so that the accesses to the application server 16 can be diffused to mitigate the processing load of the application server 16.

Referring to FIG. 17 again, the application element is a parameter associated with a VOD application obtained from the application server 16. The attributes of the application element include an id attribute, a url attribute, an expire_date attribute, and a scope attribute.

For the id attribute, the identification information of a VOD application corresponding a command concerned is specified. For the url attribute, the URL of the acquisition destination of a VOD application is specified if the command concerned is an execute command or a register command. For example, for the url attribute, the URL of the application server 16 is specified.

For the expire_date attribute, information indicative of the valid period of a VOD application is specified. For the scope attribute, information indicative of the valid scope of a VOD application is specified. If a VOD application is registered, the valid period and the valid scope of the VOD application are stored and the registered VOD application is managed in accordance with the stored valid period and valid scope.

The event element is an essential item if the action attribute is an event. For the attribute of the event element, an id attribute is specified. For the id attribute, the identification information of an event to be fired in the VOD application specified by the id attribute of the application element is specified. For a related_data element, data to be referenced at firing an event is written.

Referring to FIG. 19, there is shown a structure of meta data in segment data.

For the type attribute, the type (the meta data type) of meta data concerned is specified. The meta data types include application data (application_data), text caption data (caption), and bitmap subtitle data (subtitle).

For the target attribute, an application for processing the meta data concerned is specified. It should be noted that, if the application for processing the meta data concerned is a resident application held in the reception apparatus 12 in advance, then the target attribute is omitted.

For the ##defined structure, data of structures different for the meta data types is written.

Referring to FIG. 20, there is shown an exemplary description of a segment sequence.

In the example shown in FIG. 20, two pieces of segment data are written; to the first segment data, an execute command addressed to the reception apparatus main is written as a command of which PTS value in a range of 12000 to 15000 is the valid period. A VOD application to be obtained in accordance with the execute command concerned is obtained from the application server 16 specified by the URL that is “xxx.com/yyy” and the valid period of this VOD application is Jan. 21, 2011.

The second segment data describes an event command addressed to the reception apparatus main as a command with the PTS value between 13000 to 13100 coming within an valid period. This event command is fired in a VOD application obtained in accordance with the execute command written in the first segment data.

It should be noted that a segment sequence can be written in any manner and therefore is not limited to the description example shown in FIG. 20.

(Exemplary Operation of VOD Application of File Control Type)

Figure 21:
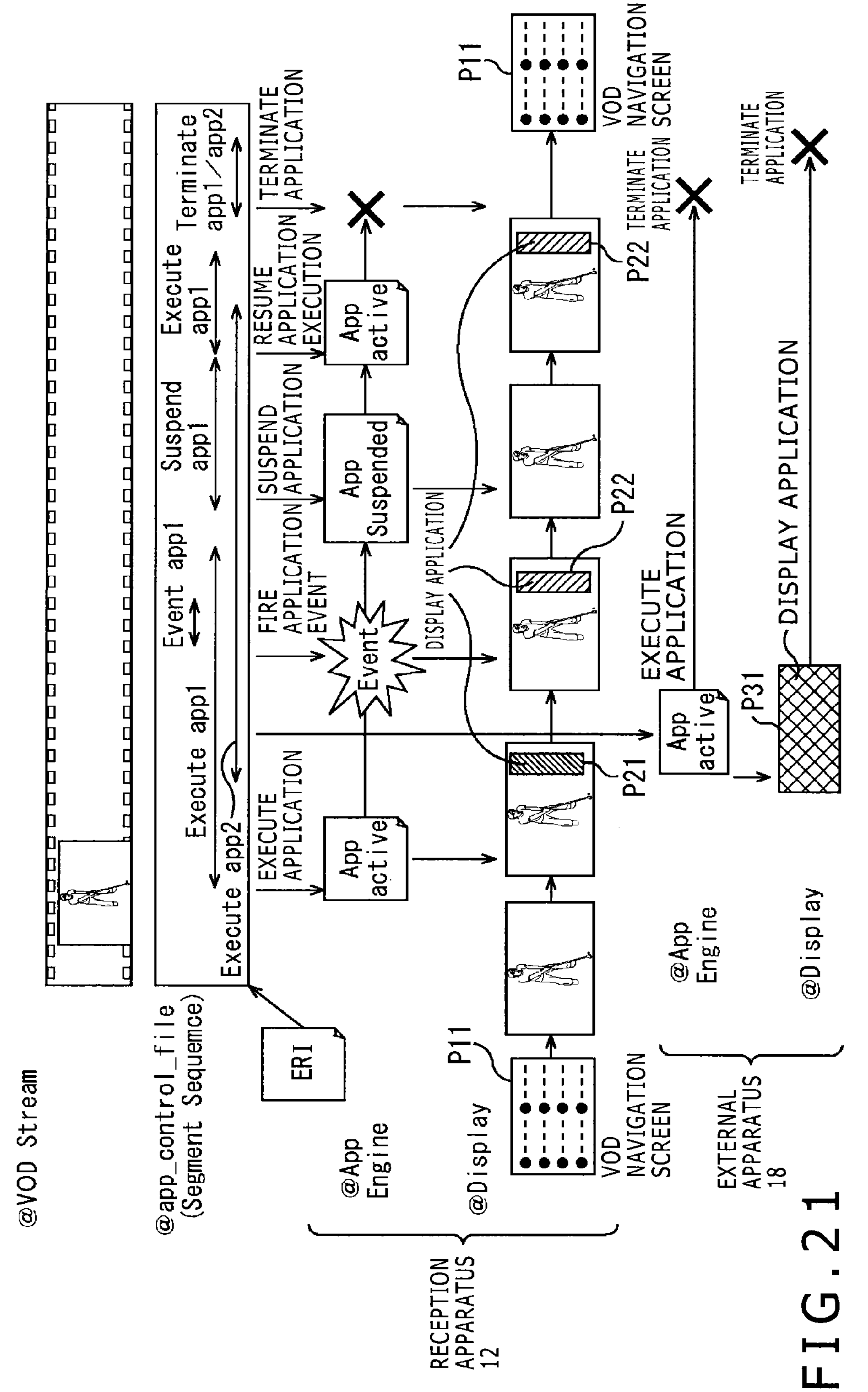
FIG. 21 is a sequence diagram illustrating an exemplary operation scenario of an application for VOD in file control type.

Executing an operation of file control type in the reception apparatus 12 allows a VOD application operation as shown in FIG. 21 for example.

Referring to FIG. 21, there is shown an exemplary operation scenario of a VOD application in file control type.

As shown in FIG. 21, if a particular piece of distribution content is selected from a list of VOD navigation screen P11 displayed on the display 52, the reception apparatus 12 requests the reproduction control information server 14 for a reproduction control meta file corresponding to the selected distribution content. In addition, in accordance with the reproduction control meta file from the reproduction control information server 14, the reception apparatus 12 requests the distribution server 15 for the selected distribution content, thereby starting the reception of this distribution content.

In addition, the reception apparatus 12 accesses the application control information server 17 to obtain application control information (the app_control_file in the figure) in accordance with the ERI of the obtained reproduction control meta file. Next, if the valid period indicative of a synchronous period for the progress of the distribution content identified by the obtained application control information comes into effect, then the reception apparatus 12 controls the operation of the VOD application in accordance with the command within this valid period.

To be more specific, if an execute command addressed to the reception apparatus main comes within the valid period, the reception apparatus 12 obtains a VOD application from the application server 16 and launches the obtained VOD application. Consequently, a video with video P21 of the VOD application superimposed on the video of the distribution content is displayed on the display 52.

Next, if an execute command addressed to an external apparatus comes within the valid period, the reception apparatus 12 transfers this execute command to the external apparatus 18. Receiving the execute command from the reception apparatus 12, the external apparatus 18 obtains a VOD application from the application server 16 and launches the obtained VOD application. Consequently, video P31 of the VOD application is displayed on the output block 98.

Next, if an event command addressed to the reception apparatus main comes within the valid period, then the reception apparatus 12 fires an event in the active VOD application and executes predetermined processing such as reading updated data to reflect the data onto the display. Consequently, for example, video P21 of the VOD application superimposingly displayed on the video of the distribution content is changed to video P22.

Further, if a suspend command addressed to the reception apparatus main comes within the valid period at a predetermined timing, then the reception apparatus 12 suspends the active VOD application. Subsequently, if an execute command addressed to the reception apparatus comes within the valid period, the reception apparatus 12 resumes the suspended VOD application.

Then, if a terminate command addressed to the reception apparatus main and the external apparatus comes within the valid period upon termination of the distribution content or the termination of a VOD application alone, the reception apparatus 12 terminates the active VOD application. At the same time, the reception apparatus 12 transfers a terminate command to the external apparatus 18. Receiving the terminate command transferred from the reception apparatus 12, the external apparatus 18 terminates the active VOD application.

Subsequently, if the distribution content that has been streaming reproduced is terminated in the reception apparatus 12, then VOD navigation screen P11 is displayed on the display 52 again.

As described above, if the reception apparatus 12 operates in file control type, the reception apparatus 12 obtains application control information from the application control information server 17 in accordance with information written to the ERI of a reproduction control meta file and controls an VOD application in accordance with a command within the valid period indicative of a synchronous period for the progress of the distribution content identified by the obtained application control information. Namely, in accordance with a command scheduled in a temporal sequence in advance in the application control information, the reception apparatus 12 can launch, event-fire, and terminate a VOD application. Further, the reception apparatus 12 can suspend a VOD application while keeping the active state of the VOD application, thereby execute and terminate another VOD application and then resuming the suspended VOD application from the suspended state.

[Exemplary Operation of Stream Control Type]

The following describes an example in which the reception apparatus 12 operates in stream control type with reference to FIGS. 22 through 28.

(Operative Connection between Apparatuses of Stream Control Type)

Figure 22:
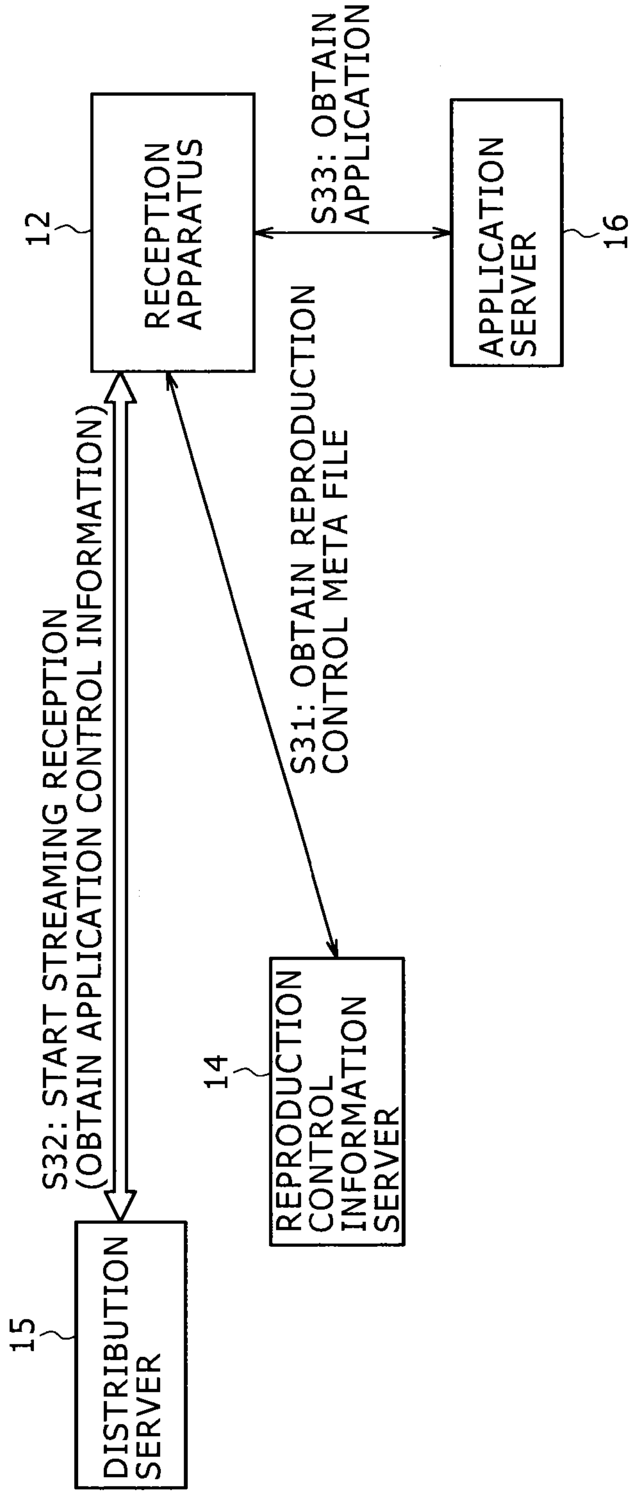
FIG. 22 is a schematic diagram illustrating operative connection between apparatuses when a reception apparatus operates in stream control type.

Referring to FIG. 22, there is shown the operative connection between apparatuses in the case where the reception apparatus 12 operates in stream control type.

As shown in FIG. 22, when the reproduction of distribution content is specified by the user, the reception apparatus 12 accesses the reproduction control information server 14 to obtain a reproduction control meta file (S31). Next, in accordance with the obtained reproduction control meta file, the reception apparatus 12 accesses the distribution server 15 to start the reception of the distribution content distributed from the distribution server 15 (S32).

At the same time, the reception apparatus 12 analyzes the obtained reproduction control meta file and operates in stream control type if the control_type attribute of the app_control_info element of the ERI is indicative of Stream.

For example, as shown in FIG. 23, in the ERI of the reproduction control meta file of stream control type, Stream is specified to the control_type attribute of the app_control_info element and an app_control_position element is specified. For the app_control_position element, audio_es indicative that application control information is embedded in an audio stream is specified.

Referring to FIG. 22 again, in accordance with the ERI (the app_control_position element) of the reproduction control meta file, the reception apparatus 12 obtains application control information embedded in the data of the distribution content from the distribution server 15. For example, if audio_es is specified for the app_control_position element of the ERI, then the reception apparatus 12 obtains the application control information embedded in an audio stream.

Next, in accordance with a command included in the obtained application control information, the reception apparatus 12 accesses the application server 16 to obtain and launch a VOD application (S33). In addition, in the reception apparatus 12, in accordance with a command indicated by the application control information, an active VOD application is suspended, resumed, event-injected, or terminated.

As described above, in the reception apparatus 12, executing an operation of stream control type executes a VOD application obtained from the application server 16 in operative connection with the distribution content obtained from the distribution server 15.

(Method of Embedding Application Control Information)

The following describes a method of embedding application control information with reference to FIGS. 24 through 27. In the following description, an example is used in which application control information is embedded in an audio stream as one example of an embedding method.

Figure 24:
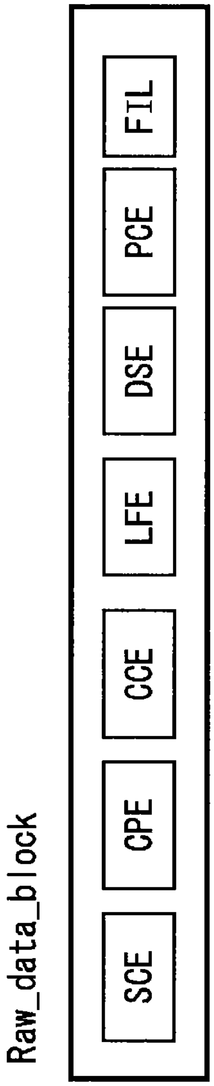
FIG. 24 shows an exemplary configuration of a frame of AAC.

FIGS. 24 and 25 show an example in which meta data storing application control information is inserted in an audio stream encoded by AAC (Advanced Audio Coding).

FIG. 24 shows a structure of a frame (Raw data block) in which audio data for AAC 1024 samples is included. If the coding method is AAC, then meta data is inserted in a DSE (Data Stream Element) area.

FIG. 25 shows an example of a DSE syntax. Element_instance_tag is indicative of a data type in the data stream element; if DSE is used as user data with DSE integrated, the value of this may be set to 0. Data_byte_align_flag is 1 and puts the entire DSE into byte alignment. The value of count or esc_count denoting the additional byte count is appropriately determined in accordance with a user data size. Then, the space of data_stream_byte is defined as metadata( ) and application control information is inserted therein.

As described above, in the method of inserting meta data into an audio stream, the meta data storing application control information is inserted in the DSE area if encoded by AAC. It should be noted that, in this example, AAC is used for encoding; if encoding is executed by AC3 (Audio Code number 3), other coding schemes are applicable by inserting meta data into an AUX (AUXILIARY DATA) area for example.

FIGS. 26 and 27 show an example of a syntax of application control information (App_command_data( )). It should be noted that any syntaxes can be applied to application control information and therefore other syntaxes than that shown in FIGS. 26 and 27 are applicable.

(Exemplary Operation of VOD Application Of Stream Control Type)

Figure 28:
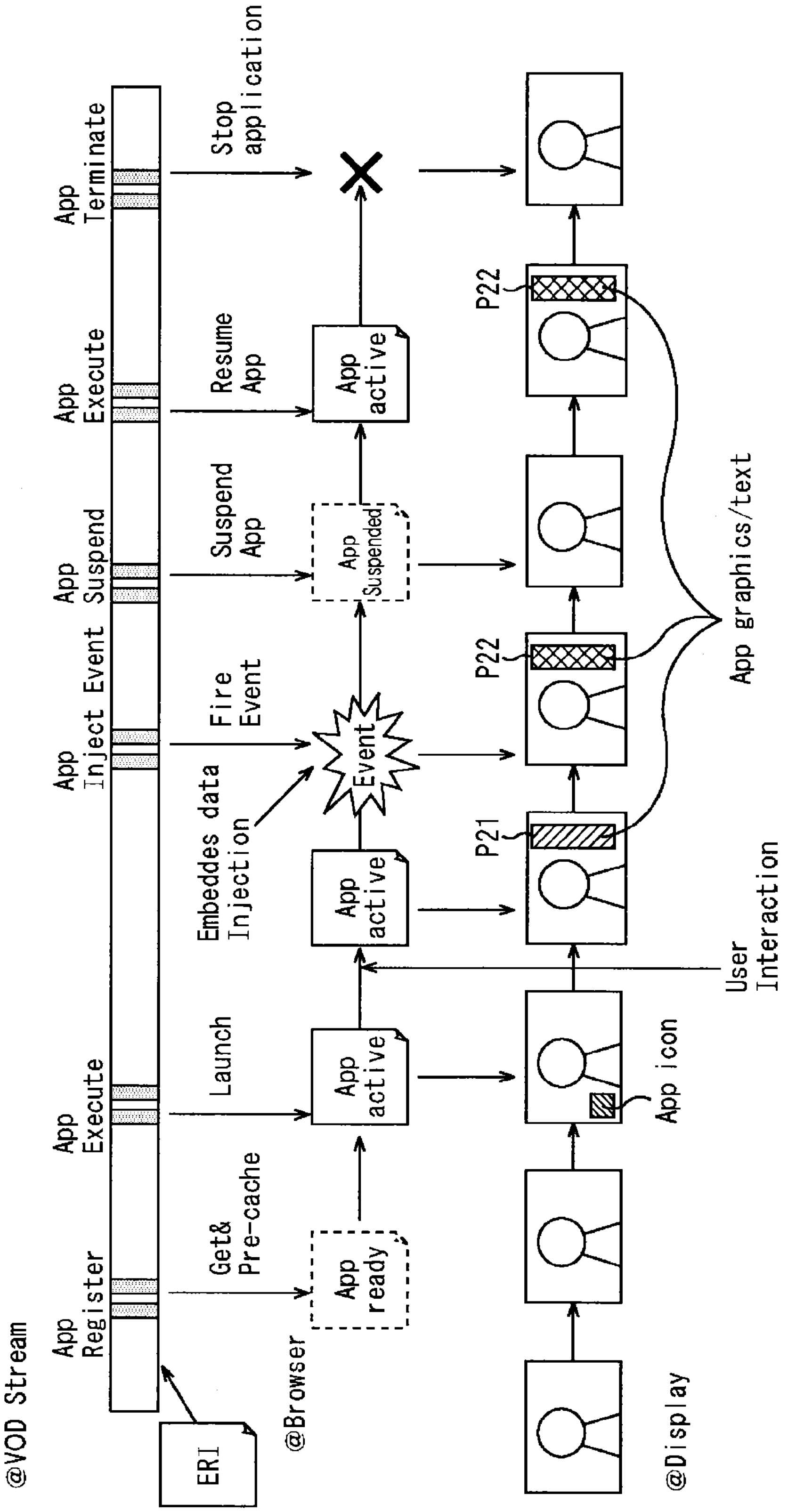
FIG. 28 is a sequence diagram illustrating an exemplary operation scenario of an application for VOD in stream control type.

In the reception apparatus 12, executing an operation of stream control type enables the operation of a VOD application as shown in FIG. 28 for example.

Referring to FIG. 28, there is shown an example of an operation scenario of a VOD application in stream control type.

In the reception apparatus 12, when the reproduction of distribution content is specified, a reproduction control meta file is obtained from the reproduction control information server 14 and an application control information embedded position is recognized from the app_control_position element written to ERI. At the same time, the reception apparatus 12 receives distribution content from the distribution server 15 and starts streaming reproduction.

When the distribution server 15 transmits the application control information of a register command for specifying the acquisition of a VOD application corresponding to the distribution content in conformity to the progress of the distribution content, the reception apparatus 12, upon receiving the application control information, normally monitors the embed position recognized in advance of an audio stream for example, thereby obtaining the application control information. Next, in accordance with a register command indicated by the application control information, the reception apparatus 12 obtains and registers the VOD application from the application server 16.

Next, when the distribution server 15 transmits the application control information of an execute command of a VOD application corresponding to distribution content in conformity to the progress of the distribution content, the reception apparatus 12, upon receiving this application control information, launches the VOD application. When the VOD application is launched, an icon indicative that the display of the VOD application is prepared is displayed on the video of the distribution content in a superimposed manner.

When this icon is selected by the user, video P21 of the VOD application is displayed on the video of the distribution content in a superimposed manner.

Next, when the distribution server 15 transmits the application control information of an event command in conformity to the progress of the distribution content, the reception apparatus 12, upon reception of this application control information, fires the event in the active VOD application. Consequently, video P21 displayed on the video of the distribution content in a superimposed manner is changed to video P22.

When the distribution server 15 transmits the application control information of a suspend command of the VOD application at a predetermined timing, the reception apparatus 12, upon receiving this application control information, suspends the active VOD application. (The associated data is held in the save memory 73B.) Then, when the distribution server 15 transmits the application control information of an execute command of the VOD application, the reception apparatus 12, upon receiving this application control information, resumes the suspended VOD application.

Further, when the distribution server 15 transmits the application control information of a terminate command in conformity to the termination of the distribution content, the reception apparatus 12, upon receiving this application control information, terminates the active VOD application. It should be noted that, if the distribution server 15 does not transmit the application control information of a terminate command, the active VOD application is terminated at the same time as the termination of the distribution content.

As described above, the reception apparatus 12, if operating in stream control type, normally monitors an application control information embedded position in accordance with the information written to the ERI of a reproduction control meta file to obtain application control information from the data of distribution content, thereby controlling a VOD application in accordance with a command indicated by the obtained application control information. Namely, in accordance with commands indicated by the application control information transmitted from the distribution server 15, the reception apparatus 12 controls operations of a VOD application, such as launch, suspend, event firing, and termination.

[VOD Application State Transitions]

Figure 29:
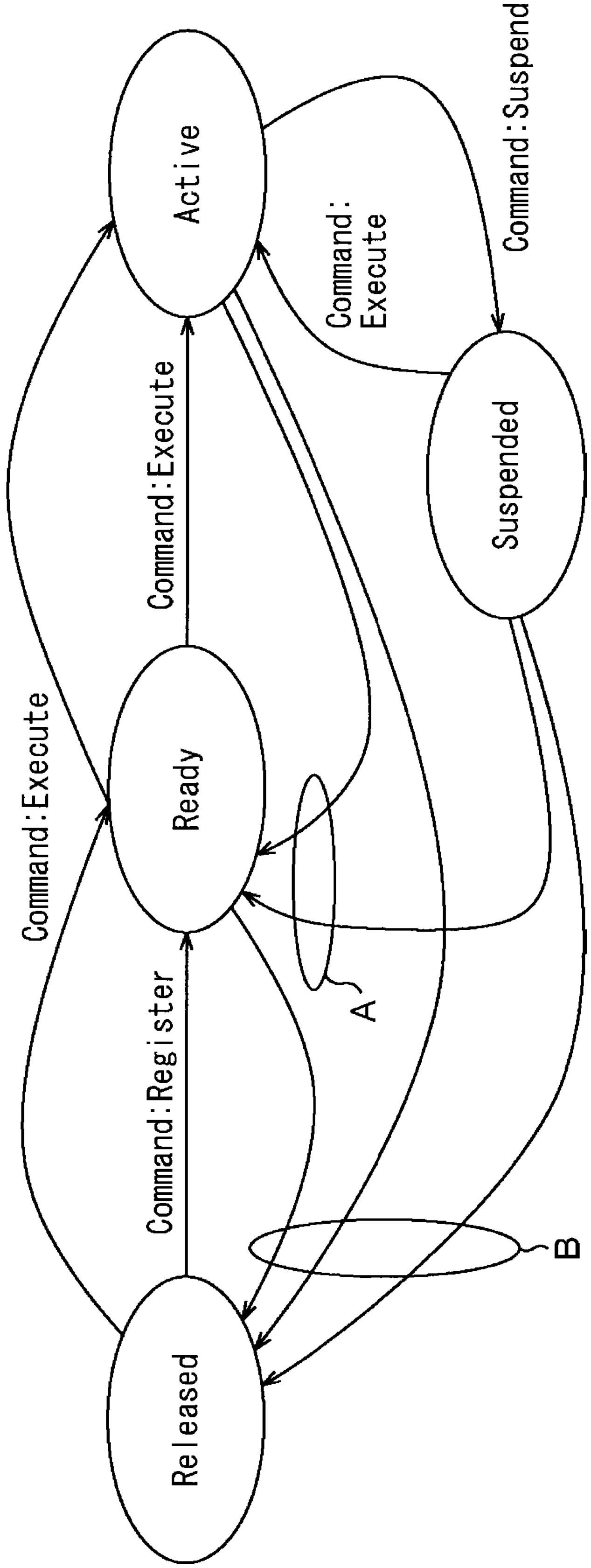
FIG. 29 is a state transition diagram illustrating an application for VOD.

Referring to FIG. 29, there is shown a state transition of a VOD application that operates in the reception apparatus 12 in accordance with register, execute, event, suspend, and terminate commands. As shown in FIG. 29, it is defined that the states of a VOD application is any one of the four states of released, ready, active, and suspended.

It should be noted that, as described above, if the reception apparatus 12 operates in direct operation type, the state of a VOD application is fixed to the active state. If the reception apparatus 12 operates in file operation type or stream operation type, the state of a VOD application transitions to any one of released, ready, active, and suspended states.

In the released state, a VOD application has not been obtained by the reception apparatus 12. In the ready state, a VOD application has been registered with the reception apparatus 12 but not launched. In the active state, a launched VOD application is being executed. In the suspended state, the execution of a VOD application is discontinued and the information indicative of a state in which the discontinuation occurred is held in the save memory 73B.

If, when a VOD application is in the released state (namely, when no VOD application has been obtained by the reception apparatus 12), a register command is received and a VOD application is obtained (or registered) in accordance with the received register command, then the VOD application transitions to the ready state.

If, when a VOD application is in the ready state, an execute command is received and the VOD application is launched in accordance with the received execute command, then the VOD application transitions to the active state.

If, when a VOD application is in the released state (namely, a VOD application has not been registered with the reception apparatus 12), an execute command is received and this VOD application is obtained and launched in accordance with the received execute command, then the VOD application transitions to the active state.

If, when the VOD application is in the active state, a suspend command is received, the active VOD application is discontinued in accordance with the received suspend command, then the VOD application transitions to the suspended state.

If, when the VOD application is in the suspended state, an execute command is received and the suspended VOD application is resumed in accordance with the received execute command, then the VOD application transitions to the active state.

If, when the VOD application is in the active state or the suspended state, a terminate command is received and the active VOD application is terminated in accordance with the received terminate command, then the VOD application transitions to the ready state ("A" in the figure). It should be noted that the transition to the ready state takes place when another VOD application is executed, in addition to the launching of a terminate command.

If the application valid period of a command has passed when a VOD application is in the ready state, the active state, or the suspended state, then the VOD application transitions to the released state ("B" in the figure).

[Distribution Content Reproduction Processing]

The following describes the distribution content reproduction processing that is executed by the reception apparatus 12 with reference to the flowcharts shown in FIGS. 30 through 33.

Figure 30:
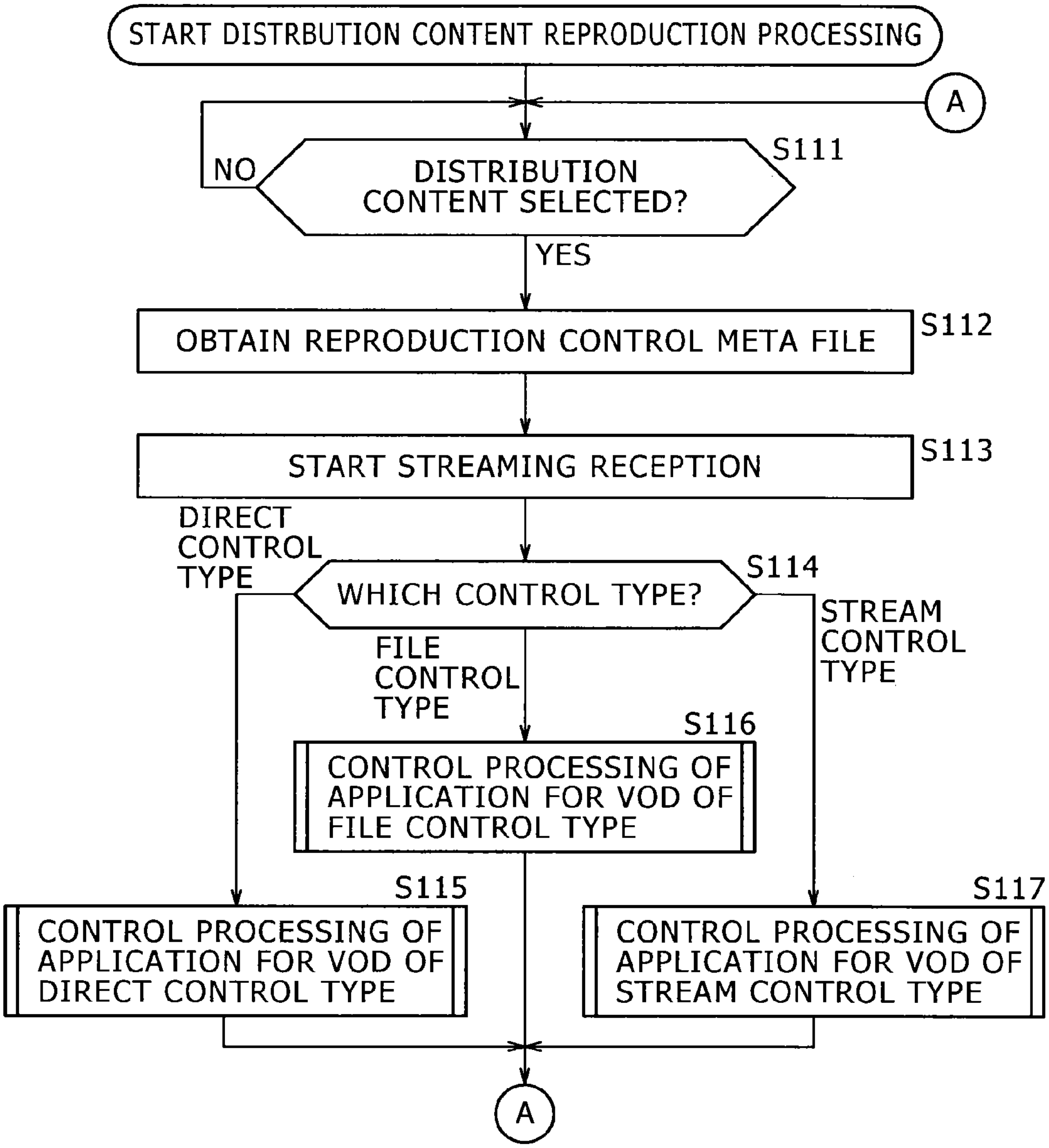
FIG. 30 is a flowchart indicative of distribution content reproduction processing.

Referring to FIG. 30, there is shown the flowchart indicative of the distribution content reproduction processing.

In step S111, the control block 68 determines on the basis of an operation signal from the operator block 70 whether distribution content has been selected by the user. If distribution content is found selected by the user ("YES" in step S111), then the procedure goes to step S112. At this moment, the control block 68 controls the communication I/F 71 to access the reproduction control information server 14 to request for a reproduction control meta file.

In step S112, the analysis block 66 controls the communication I/F 71 to obtain a reproduction control meta file from the reproduction control information server 14. In accordance with an analysis result of the obtained reproduction control meta file, the analysis block 66 controls the communication I/F 71 to access the distribution server 15 to request for distribution content.

The streaming reproduction processing block 75 controls the communication I/F 71 to obtain the distribution content from the distribution server 15 to supply the obtained distribution content to the demultiplexer 62. Consequently, streaming reception of the distribution content is executed in the reception apparatus 12 (S113). Next, an audio stream and a video stream separated by the demultiplexer 62 are decoded by the audio decoder 63 and the video decoder 65, respectively to be outputted, thereby executing the streaming reproduction of the distribution content.

In step S114, in accordance with the analysis result of the obtained reproduction control meta file, the analysis block 66 determines in which of the types the reception apparatus 12 operates, direct control type, file control type, and stream control type.

If the reception apparatus 12 is found to operate in direct control type in step S114, then the procedure goes to step S115. In step S115, on the basis of the analysis result obtained through the analysis block 66, the control block 68 controls the application engine 72 to execute VOD application control processing of direct control type.

It should be noted that details of the VOD application control processing of direct control type will be described later with reference to the flowchart shown in FIG. 31.

If the reception apparatus 12 is found to operate in file control type in step S114, then the procedure goes to step S116. In step S166, the control block 68 controls the application engine 72 on the basis of the analysis result obtained through the analysis block 66 to execute the VOD application control processing of file control type.

It should be noted that details of the VOD application control processing of file control type will be described later with reference to the flowchart shown in FIG. 32.

Further, if the reception apparatus 12 is found to operate in stream control type in step S114, then the procedure goes to step S117. In step S117, the control block 68 controls the application engine 72 on the basis of an analysis result obtained through the analysis block 66 to execute VOD application control processing of stream control type.

It should be noted that details of the VOD application control processing of stream control type will be described later with reference to the flowchart shown in FIG. 33.

When the VOD application control processing of steps S115 through S117 has been completed, the procedure returns to step S111 to repeat the above-mentioned processing operations therefrom.

In the above-mentioned description, distribution content reproduction processing has been explained.

(Details of VOD Application Control Processing of Direct Control Type)

Figure 31:
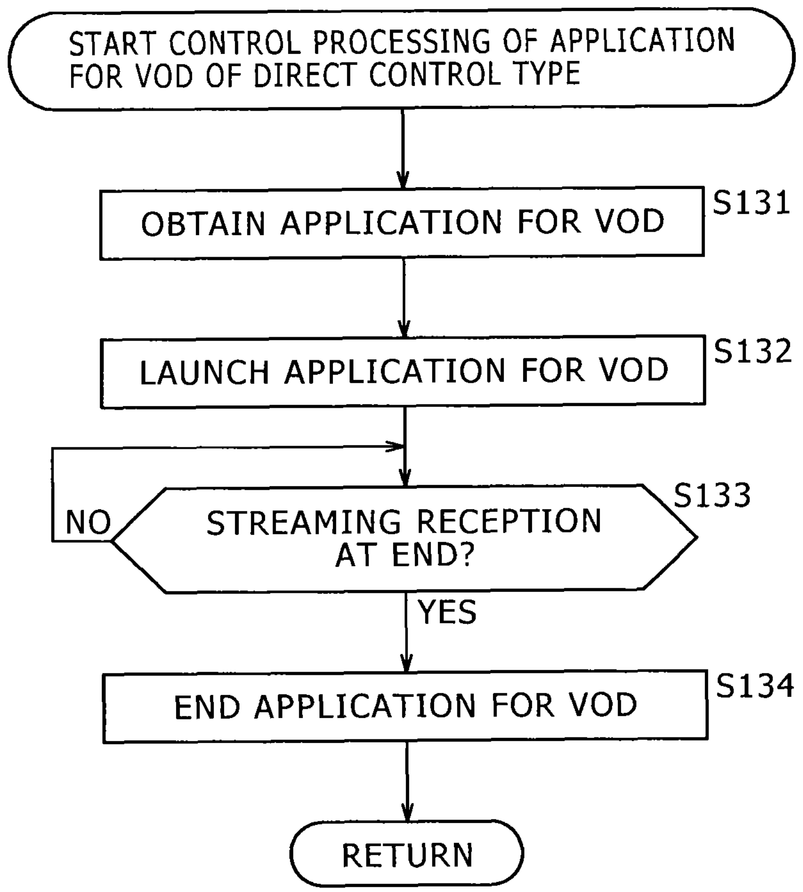
FIG. 31 is a flowchart indicative of control processing of an application for VOD of direct control type.

The following describes details of the VOD application control processing of direct control type corresponding to step S115 of FIG. 30 with reference to the flowchart shown in FIG. 31.

In step S131, under the control of the control block 68, the application engine 72 controls the communication I/F 71 to obtain a VOD application from the application server 16 and stores the obtained VOD application into the cache memory 76. In step S132, the application engine 72 launches the VOD application stored in the cache memory 76. Consequently, on the display 52, a video of the VOD application is displayed as superimposed on a video of distribution content.

Subsequently, the processing of step S133 is repeated until the streaming reception of distribution content is terminated. In the reception apparatus 12, while streaming reproduction is executed, the video of the VOD application is displayed as superimposed on the video of distribution content.

Then, when the distribution content being streaming-reproduced ends ("YES" in step S133), then the procedure goes to step S134. In step S134, under the control of the control block 68, the application engine 72 terminates the active VOD application. Consequently, the VOD application is terminated at the same time as the termination of the distribution content.

When the VOD application control processing of direct control type is terminated, the procedure returns to step S115 to repeat the above-mentioned processing operations therefrom.

(Details of VOD Application Control Processing of File Control Type)

Figure 32:
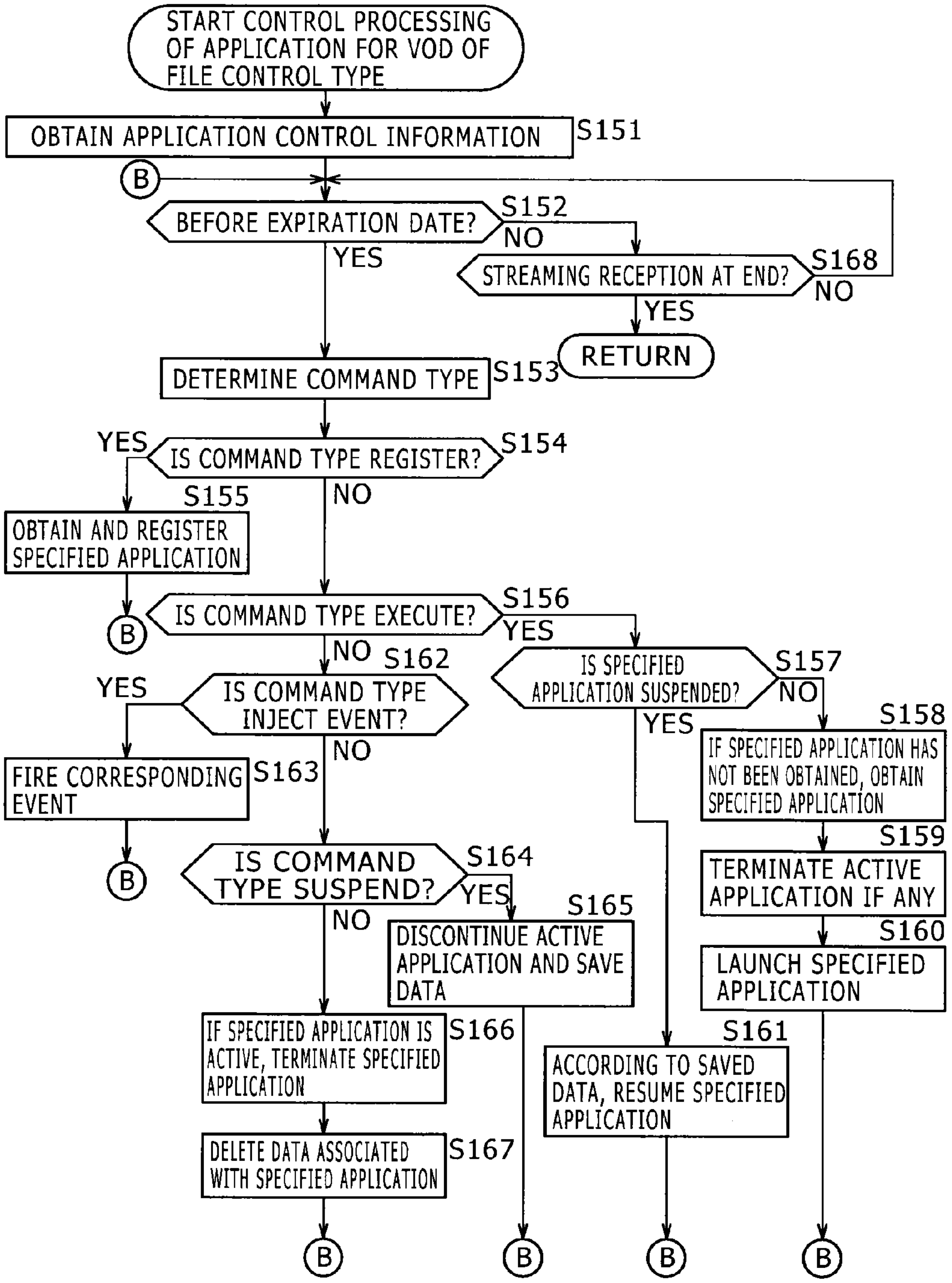
FIG. 32 is a flowchart indicative of control processing of an application for VOD of file control type.

The following describes details of the VOD application control processing of file control type corresponding to step S116 of FIG. 30 with reference to the flowchart shown in FIG. 32.

In step S151, in accordance with an analysis result of a reproduction control meta file, the analysis block 66 controls the communication I/F 71 to obtain application control information from the application control information server 17. The analysis block 66 analyzes the obtained application control information and supplies a result of this analysis to the control block 68.

In step S152, the control block 68 determines on the basis of the analysis result from the analysis block 66 whether the progress timing of the active distribution content is within a segment valid period or not.

If the progress timing is found to be within the segment valid period in step S152, then the procedure goes to step S153. In step S153, the control block 68 reads a command within the segment valid period to determine whether this command is register, execute, event, suspend, or terminate.

In step S154, the control block 68 determines whether the decision in step S153 is indicative of register or not. If the decision is found indicative of register, the procedure goes to step S155. In step S155, the control block 68 controls the application engine 72 to access the application server 16 identified by an application acquisition destination URL, thereby obtaining and registering a VOD application. Then, the procedure returns to step S152 to repeat the above-mentioned processing operations therefrom.

In step S154, if the decision of step S153 is found not indicative of register, then the procedure goes to step S156. In step S156, the control block 68 determines whether the decision of step S153 is indicative of execute or not. If the decision is found indicative of execute, then the procedure goes to step S157.

In step S157, under the control of the control block 68, the application engine 72 determines whether the VOD application identified by application ID is suspended (or in the suspend state) or not. To be more specific, the VOD application is determined to be suspended if the data indicative of the suspended state of the VOD application identified by application ID is saved in the save memory 73B.

In step S157, if the VOD application identified by application ID is found not to be suspended, then the procedure goes to step S158. In step S158, under the control of the control block 68, the application engine 72 obtains the VOD application identified by application ID if this VOD application has not been obtained (not stored in the cache memory 76).

In step S159, under the control of the control block 68, the application engine 72 terminates the active VOD application if any.

In step S160, under the control of the control block 68, the application engine 72 launches the VOD application identified by application ID. Subsequently, the procedure returns to step S152 to repeat the above-mentioned processing operations therefrom.

It should be noted that, if the VOD application identified by application ID is found to be suspended (or in the suspended state) in step S157, then the procedure goes to step S161. In step S161, under the control of the control block 68, the application engine 72 moves the data from the save memory 73B to the work memory 73A to launch the VOD application identified by application ID. Consequently, the execution of the suspended VOD application identified by application ID is resumed from the suspended state. Then, the procedure returns to step S152 to repeat the processing operations therefrom.

If the decision of step S153 is found not to be execute in step S156, then the procedure goes to step S162. In step S162, the control block 68 determines whether the decision of step S153 is indicative of event or not. If the decision is found indicative of event, then the procedure goes to step S163.

In step S163, only when there is an application ID match, the control block 68 controls the application engine 72 to fire (or execute) the event corresponding to event ID in the active VOD application. Then, the procedure returns to step S152 to repeat the processing operations therefrom.

In step S162, if the decision of step S153 is found not indicative of event, then the procedure goes to step S164. In step S164, the control block 68 determines whether the decision of step S153 is indicative of suspend or not. If the decision is found to be indicative of suspend, the procedure goes to step S165.

In step S165, under the control of the control block 68, the application engine 72 saves the data (namely, the data currently written to the work memory 73A; if the information to be displayed is layered, this data includes the information indicative of the layer of the displayed information) indicative of the state of the currently active VOD application into the save memory 73B. Then, the procedure returns to step S152 to repeat the above-mentioned processing operations therefrom.

In step S164, if the decision of step S153 is found not indicative of suspend, then the decision of step S153 is indicative of terminate, so that the procedure goes to step S166. In step S166, under the control of the control block 68, the application engine 72 terminates the VOD application identified by application ID if this VOD application is active. In step S167, under the control of the control block 68, the application engine 72 deletes the data associated with the VOD application identified by application ID from the work memory 73A and the save memory 73B and deletes this VOD application from the cache memory 76. Then, the procedure returns to step S152 to repeat the above-mentioned processing operations therefrom.

If the segment valid period is found passed, namely, if the progress timing of distribution content is found over the segment valid period for example in step S152, then the procedure goes to step S168. In step S168, it is determined whether the streaming-reproduced distribution content has terminated or not. If this distribution content is found not terminated, then the procedure goes to step S152 to repeat the above-mentioned processing operations therefrom.

On the other hand, if the streaming-reproduced distribution content is found terminated ("YES" in step S168), then the VOD application control processing of file control type is ended. When the VOD application control processing of file control type has come to an end, the procedure returns to step S116 to repeat the above-mentioned processing operations therefrom.

(Details of VOD Application Control Processing of Stream Control Type)

Figure 33:
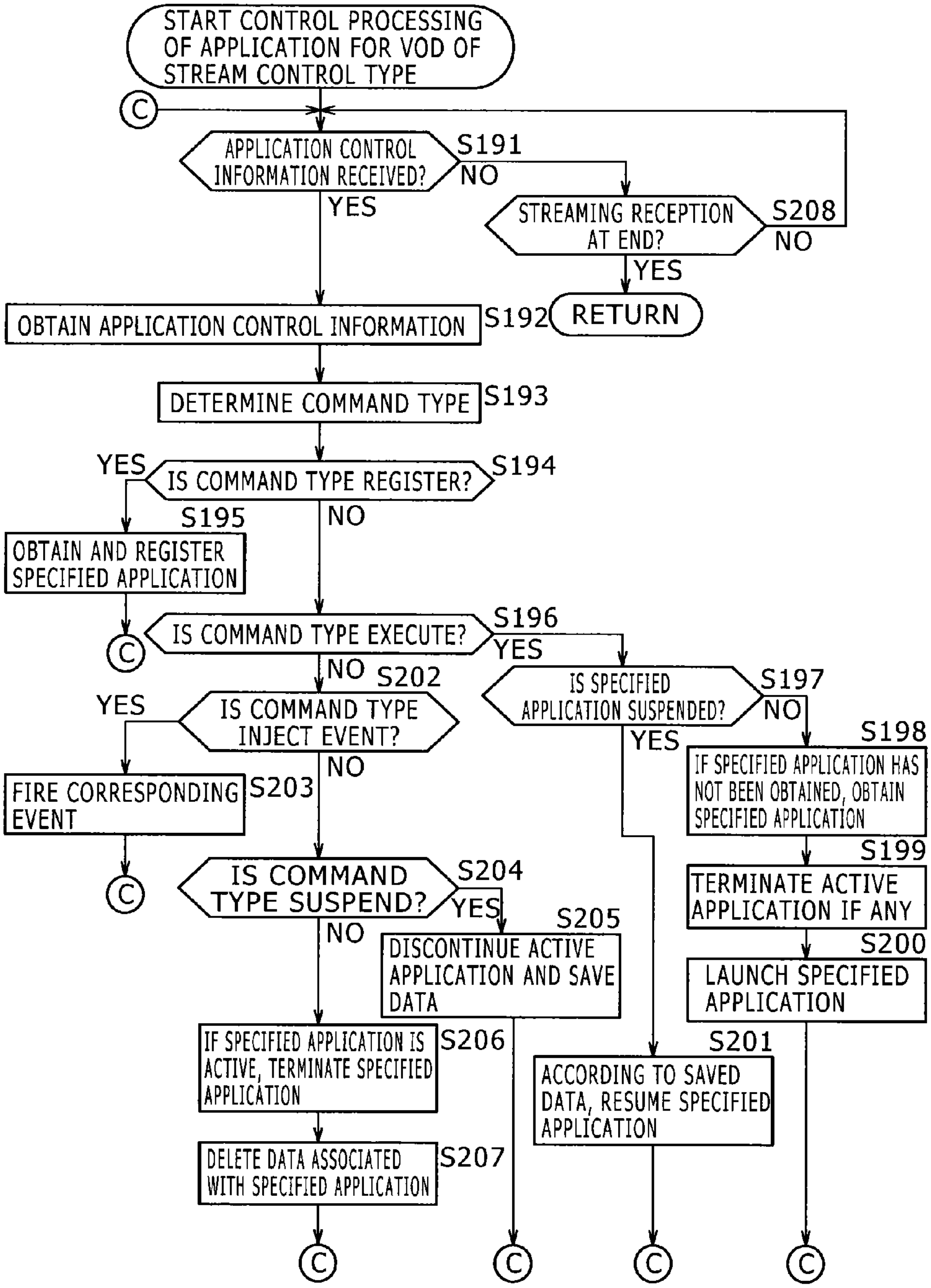
FIG. 33 is a flowchart indicative of control processing of an application for VOD of stream control type.

The following describes details of the VOD application control processing of stream control type corresponding to step S117 of FIG. 30 with reference to the flowchart shown in FIG. 33.

In step S191, the analysis block 66 normally monitors a recognized application control information embedded position, such as an audio stream for example, to determine whether application control information has been received or not. If application control information is found to have been received in step S191, then the procedure goes to step S192. In step S192, the analysis block 66 obtains the application control information embedded in the data of distribution content. When the application control information is obtained in step S192, the procedure goes to step S193.

In steps S193 through S208, it is determined whether a command indicated by application control information is register, execute, event, suspend, or terminate as with steps S153 through S168 shown in FIG. 32. In accordance with the type of a determined command, the operation of a VOD application is controlled. To be more specific, the VOD application control processing of stream control type is repetitively executed while the user is viewing the streaming reproduction of distribution content, thereby launching, event-firing, or terminating the VOD application in operative connection with the distribution content. Further, the VOD application is suspended with the state of execution held, thereby executing and terminating another VOD application and then resuming the suspended VOD application from the suspended state.

Then, when the VOD application control processing of stream control type comes to an end, the procedure returns to step S117 shown in FIG. 30 to repeat the above-mentioned processing operations therefrom.

As described above, according to the present technology, VOD applications that are executed in operative connection with the distribution content that is streaming-reproduced can be provided. Especially, if there are two or more pieces of distribution content to be streaming-reproduced, a VOD application can be individually executed for each piece of the distribution content.

[Description of Computer to which Present Technology is Applied]

The above-mentioned sequence of processing operations may be executed by software as well as hardware. If the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 34:
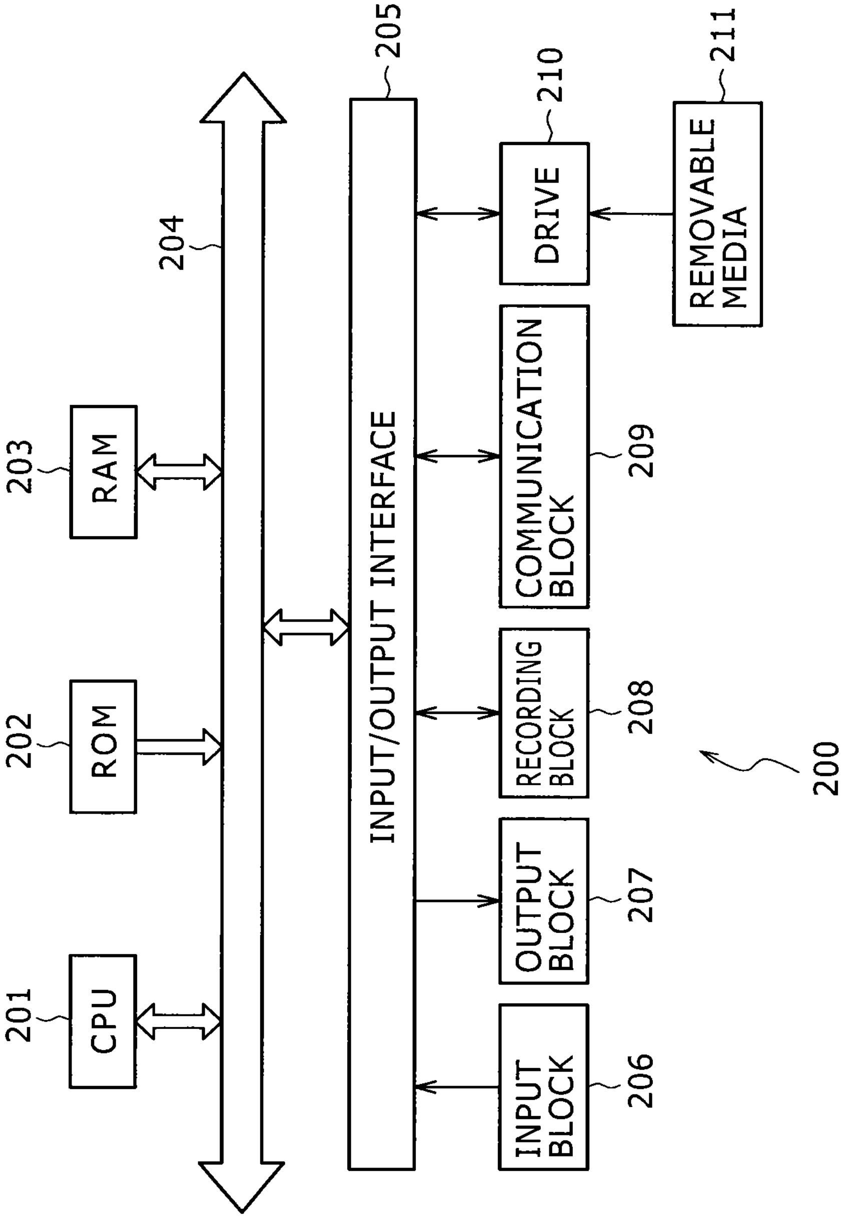
FIG. 34 is a block diagram illustrating an exemplary configuration of a computer.

Referring to FIG. 34, there is shown a block diagram illustrating an exemplary hardware configuration of a computer that executes the above-mentioned sequence of processing operations by programs.

In a computer 200, a CPU (Central Processing Unit) 201, a ROM (Read Only Memory) 202, and a RAM (Random Access Memory) 203 are interconnected by a bus 204.

The bus 204 is connected to an input/output interface 205. The input/output interface 205 is connected to an input block 206, an output block 207, a recording block 208, a communication block 209, and a drive 210.

The input block 206 is made up of a keyboard, a mouse, and a microphone, for example. The output block 207 is made up of a display and a speaker, for example. The recording block 208 is made up of a hard disk drive or a nonvolatile memory, for example. The communication block 209 is made up of a network interface for example. The drive 210 drives a removable media 211, such as a magnetic disk, an optical disk, a magneto-optical disk, or a semiconductor memory.

In the computer 200 configured as described above, the CPU 201 loads a program from the recording block 208 into the RAM 203 through the input/output interface 205 and the bus 204 and executes the loaded program, thereby executing the sequence of processing operations described above.

Programs to be executed by the computer 200 (or the CPU 201) can be provided as recorded to the removable media 211 that is package media for example. At the same time, programs can be provided through wireless or wired transmission media, such as a local area network, the Internet, or digital satellite broadcasting.

In the computer 200, a program can be installed into the recording block 208 via the input/output interface 205 by loading the removable media 211 in which the program is stored onto the drive 210. Also, a program can be received at the communication block 209 via wireless or wired transmission media and the received program can be installed in the recording block 208. Besides, a program can be installed in the ROM 202 or the recording block 208 in advance.

It should be noted that a program to be executed by the computer 200 can be executed in a time-dependent manner along a sequence described in the present disclosure or in parallel or on an on-demand basis.

The processing steps for describing a program for the computer 200 to execute various processing operations need not be executed in a time-dependent manner along a sequence described as a flowchart; namely, these processing steps include processing steps (parallel processing operations for object processing operations, for example) that are executed in parallel or discretely.

It should also be noted that programs may be processed by one unit of computer or by two or more units of computers in a distributed manner. Further, programs may be transmitted to a remote computer to be executed.

It should also be noted that term "system" as used herein denotes a set of two or more component elements (apparatuses or modules (or parts) for example) and these component elements need not be accommodated in a single housing. Therefore, two or more apparatuses accommodated in separate housings and interconnected via a network and a single apparatus with two or more modules accommodated in a single housing constitute a system.

While preferred embodiments of the present technology have been described using specific terms, such description is for illustrative purpose only, and it is to be understood that changes and variations may be made without departing from the spirit or scope of the following claims.

For example, the present technology can take a configuration of cloud computing in which one function is dividedly executed by two or more apparatuses through networks to jointly process the function.

Each of the steps described in the flowcharts described above can be executed by a single apparatus or jointly by two or more apparatuses.

Further, if two or more processing operations are included in a single step, these two or more processing operations included in this single step can be executed by a single apparatus or jointly by two or more apparatuses.

It should be noted that the present technology can take the following configuration.

(1) A reproduction apparatus including a reproduction control information acquisition block configured to acquire reproduction control information for controlling reproduction of content; a reproduction block configured to reproduce, in accordance with the acquired reproduction control information, the content that is distributed; and a control block configured to control an operation of an application program that is executed in operative connection with the content being reproduced in accordance with information associated with the application program and obtained from the acquired reproduction control information.

(2) In the reproduction apparatus shown in (1) above, the reproduction control information is specified with any one of a first type for controlling an operation of the application program in accordance with information directly written to the reproduction control information, a second type for controlling an operation of the application program in accordance with application control information obtained from an information processing apparatus for providing the application control information for controlling an operation of the application program, and a third type for controlling an operation of the application program in accordance with the application control information embedded in data of the content. The control block controls an operation of the application program in accordance with the specified type of the reproduction control information.

(3) In the reproduction apparatus shown in (2) above, if the first type is specified in the reproduction control information, then the control block launches the application program in accordance with reproduction start of the content and terminates the application program in accordance with reproduction end of the content.

(4) In the reproduction apparatus shown in (2) above, if the second type is specified in the reproduction control information, then the control block controls an operation of the application program in accordance with a command within a valid period indicative of a synchronous period for progression of the content identified by the application control information obtained from the information processing apparatus.

(5) In the reproduction apparatus shown in (4) above, the command is indicative of any one of acquisition and registration, acquisition and launch, event firing, suspend, and termination of the application program. The control block controls any one of acquisition and registration and acquisition and launch of the application program, and event firing, suspend, and termination of the active application program in accordance with the command.

(6) In the reproduction apparatus shown in (4) or (5) above, the valid period is identified by a PTS indicative of a progress position of the corresponding content.

(7) In the reproduction apparatus shown in (2) above, if the third type is specified in the reproduction control information, the control block controls an operation of the application program in accordance with a command indicated by the application control information embedded in an embed position identified by the reproduction control information.

(8) In the reproduction apparatus shown in (7) above, the command is indicative of any one of acquisition and registration, acquisition and launch, event firing, suspend, and termination of the application program. The control block controls any one of acquisition and registration and acquisition and launch of the application program, and event firing, suspend, and termination of the active application program in accordance with the command.

(9) In the reproduction apparatus shown in (7) or (8) above, the application control information is inserted in a DSE area in a frame structure of an audio stream encoded by AAC.

(10) The reproduction apparatus shown in (1) above further has a reception block configured to receive a digital television broadcast signal.

(11) A reproduction method for a reproduction apparatus has acquiring reproduction control information for controlling reproduction of content; reproducing, in accordance with the acquired reproduction control information, the content that is distributed; and controlling an operation of an application program that is executed in operative connection with the content being reproduced in accordance with information associated with the application program and obtained from the acquired reproduction control information. Each of these steps is executed by the reproduction apparatus.

(12) A program for making a computer function as a reproduction control information acquisition block configured to acquire reproduction control information for controlling reproduction of content; a reproduction block configured to reproduce, in accordance with the acquired reproduction control information, the content that is distributed; and a control block configured to control an operation of an application program that is executed in operative connection with the content being reproduced in accordance with information associated with the application program and obtained from the acquired reproduction control information.

What is claimed is:

1. A reproduction apparatus comprising:

reproduction control information acquisition circuitry configured to acquire reproduction control information for controlling reproduction of distributed content;

reproduction circuitry configured to reproduce, in accordance with said acquired reproduction control information, said distributed content, which is distributed; and control circuitry configured to control an operation of an application program that is executed in operative connection with said distributed content, each of said application program, said distributed content, and said reproduction control information being obtained independently of one another, the operation being selected from a group of operations comprising: acquisition and registration, acquisition and launch, event firing, suspension, and termination operations, the operation being controlled which is reproduced based on information associated with said application program and obtained from said acquired reproduction control information.

2. The reproduction apparatus according to claim 1, wherein said reproduction control information is specified with at least one of a first type for controlling an operation of said application program in accordance with information directly written to said reproduction control information, a second type for controlling the operation of said application program in accordance with application control information obtained from an information processing apparatus, and a third type for controlling the operation of said application program in accordance with said application control information embedded in data of said distributed content, said control circuitry controlling the operation of said application program in accordance with said specified type of said reproduction control information.

3. The reproduction apparatus according to claim 2, wherein, when said first type is specified in said reproduction control information, said control circuitry launches said application program in accordance with a reproduction start of said distributed content and terminates said application program in accordance with a reproduction end of said distributed content.

4. The reproduction apparatus according to claim 2, wherein, when said second type is specified in said reproduction control information, the control circuitry controls the operation of said application program in accordance with a command within a valid period indicative of a synchronous period for progression of said distributed content identified by said application control information.

5. The reproduction apparatus according to claim 4, wherein said valid period is identified by a Presentation Time Stamp indicative of a progress position of said distributed content.

6. The reproduction apparatus according to claim 2, wherein, when said third type is specified in said reproduction control information, said control circuitry controls the operation of said application program in accordance with a command indicated by said application control information embedded in an embed position identified by said reproduction control information.

7. The reproduction apparatus according to claim 6, wherein said application control information is inserted in a DSE area in a frame structure of an audio stream encoded by Advanced Audio Coding.

8. The reproduction apparatus according to claim 2, wherein when said first type for controlling an operation of said application program is specified, said reproduction circuitry performs direct control of said application program.

9. The reproduction apparatus according to claim 2, wherein when said second type for controlling an operation of said application program is specified, distribution of content is initiated after reception of said application program at said reproduction circuitry.

10. The reproduction apparatus according to claim 9, wherein when said second type for controlling an operation of said application program is specified, said reproduction circuitry is enabled to control the operation of two or more application programs simultaneously.

11. The reproduction apparatus according to claim 1, further comprising:

reception circuitry configured to receive a digital television broadcast signal.

12. The reproduction apparatus according to claim 1, wherein said reproduction control information further comprises:

entry resource information (ERI) configured to control the reproduction of distribution content and information associated with a video on demand (VOD) application;

license link information (LLI) configured to identify license parameters associated with the distribution content; and network content control (NCI) configured to control streaming reproduction.

13. A reproduction method for a reproduction apparatus comprising:

acquiring reproduction control information, by processing circuitry of the reproduction apparatus, for controlling reproduction of distributed content;

reproducing, in accordance with said acquired reproduction control information, said distributed content, which is distributed; and controlling an operation of an application program that is executed in operative connection with said distributed content, each of said application program, said distributed content, and said reproduction control information being obtained independently of one another, the operation being selected from a group of operations comprising: acquisition and registration, acquisition and launch, event firing, suspension, and termination operations, the operation being controlled which is reproduced based on information associated with said application program and obtained from said acquired reproduction control information, each of said steps being executed by said reproduction apparatus.

14. A non-transitory computer-readable storage medium having computer readable program codes embodied in the computer readable storage medium that, when executed cause a computer to execute:

acquiring reproduction control information for controlling reproduction of distributed content;

reproducing, in accordance with said acquired reproduction control information, said distributed content, which is distributed; and controlling an operation of an application program that is executed in operative connection with said distributed content, each of said application program, said distributed content, and said reproduction control information being obtained independently of one another, the operation being selected from a group of operations comprising: acquisition and registration, acquisition and launch, event firing, suspension, and termination operations, the operation being controlled which is reproduced based on information associated with said application program and obtained from said acquired reproduction control information.

* * * * *